US012617691B2

(12) United States Patent
Cohen et al.

(10) Patent No.: US 12,617,691 B2
(45) Date of Patent: May 5, 2026

(54) RECOVERY OF COMMERCIAL SUBSTANCES FROM APATITE MINERAL

(71) Applicant: EasyMining Sweden AB, Sollentuna (SE)

(72) Inventors: Yariv Cohen, Uppsala (SE); Angela Van Der Werf, Solna (SE); Viktoria Westlund, Uppsala (SE); Cristian Tunsu, Uppsala (SE); Hugo Royen, Uppsala (SE)

(73) Assignee: EASYMINING SWEDEN AB, Sollentuna (SE)

( * ) Notice: Subject to any disclaimer, the term of this patent is extended or adjusted under 35 U.S.C. 154(b) by 424 days.

(21) Appl. No.: 18/038,490

(22) PCT Filed: Nov. 23, 2021

(86) PCT No.: PCT/SE2021/051165
§ 371 (c)(1),
(2) Date: May 24, 2023

(87) PCT Pub. No.: WO2022/115021
PCT Pub. Date: Jun. 2, 2022

(65) Prior Publication Data
US 2024/0101440 A1 Mar. 28, 2024

(30) Foreign Application Priority Data
Nov. 25, 2020 (SE) .................................. 2051374-3

(51) Int. Cl.
*C01F 11/46* (2006.01)
*C01B 25/26* (2006.01)

(52) U.S. Cl.
CPC .............. *C01F 11/46* (2013.01); *C01B 25/26* (2013.01)

(58) Field of Classification Search
None
See application file for complete search history.

(56) References Cited

U.S. PATENT DOCUMENTS 3,512,927 A 5/1970 Betts
3,627,485 A * 12/1971 Hori ........................ C01F 11/46
423/157.4
(Continued)

FOREIGN PATENT DOCUMENTS

AR 109574 A1 12/2018
CN 102134063 A 7/2011
(Continued)

OTHER PUBLICATIONS

English translation of CN-106185853-A Description. (Year: 2016).*
(Continued)

*Primary Examiner* — Anthony J Zimmer
*Assistant Examiner* — Zachary John Baum
(74) *Attorney, Agent, or Firm* — Harness, Dickey & Pierce, P.L.C.; Anthony G. Fussner

(57) ABSTRACT

A method for recovery of commercial substances from apatite mineral comprises dissolving of apatite mineral in an acid comprising hydrochloride. The dissolution gives a first liquid solution comprising phosphate, calcium and chloride ions. The first liquid solution is treated into a second liquid solution comprising calcium and chloride ions. This treatment in turn comprises extracting of a major part of the phosphate ions with an organic solvent. A bleed solution is removed from the second solution. Solid gypsum comprising at least 70% in a di-hydrate crystal form is precipitated from the second solution. This precipitation of solid gypsum comprises adding the second solution and sulfuric acid simultaneously into a continuous-stirred reactor in the presence of gypsum crystals. Thereby, the precipitation of solid gypsum gives a third liquid solution comprising hydrochlo-
(Continued)

ride. An arrangement for recovery of commercial substances from apatite mineral is also presented.

20 Claims, 10 Drawing Sheets

(56) References Cited

U.S. PATENT DOCUMENTS

| | | | |
|---|---|---|---|
| 9,738,522 | B2 | 8/2017 | Cohen et al. |
| 9,783,428 | B1 | 10/2017 | Demopoulos et al. |
| 10,030,286 | B1 | 7/2018 | Xu et al. |
| 2005/0238558 | A1 | 10/2005 | Takhim |
| 2009/0272230 | A1 | 11/2009 | Mackowski et al. |
| 2015/0307400 | A1* | 10/2015 | Devenney ............... C04B 28/10 |
| | | | 423/430 |
| 2016/0060113 | A1* | 3/2016 | Cohen .................... C01G 49/10 |
| | | | 422/187 |
| 2017/0291826 | A1 | 10/2017 | Demopoulos et al. |
| 2021/0292179 | A1 | 9/2021 | Kim et al. |

FOREIGN PATENT DOCUMENTS

| | | | | |
|---|---|---|---|---|
| CN | 104176720 | A | * | 12/2014 |
| CN | 106185853 | A | * | 12/2016 ........... C01B 25/222 |
| ES | 2013211 | A6 | | 4/1990 |
| GB | 1051521 | A | | 12/1966 |
| WO | WO-2010138045 | A1 | | 12/2010 |
| WO | WO-2014178788 | A1 | | 11/2014 |
| WO | WO-2017151016 | A1 | | 9/2017 |

OTHER PUBLICATIONS

English translation of CN-104176720-A Description. (Year: 2014).*

The Nest Group. Molarity of Concentrated Acids & Bases, 2021. Accessed electronically at https://www.nestgrp.com/protocols/trng/molarity.shtml on Dec. 4, 2025. (Year: 2021).*

Taha et al.; Dissolution kinetics of phosphate rocks, precipitation of CP and production of pure phosphoric acid; Lap Lambert Academic Publishing; 2014, ISBN: 978-3-659-12390-0.

Naito and Suzuki; The mechanism of the extraction of several proton acids by tri.n.butyl phosphate; Japan Atomic Energy Research Institute; 1961.

Jin et al.; Liquid-Liquid Equilibrium in the System Phosphoric Acid/Water/Tri-n-butyl Phosphate/Calcium Chloride; J. Chem. Eng. Data; 2010, 55, 3196-3199.

Pereira and Bilal; Phosphoric acid extraction and rare earth recovery from apatites of the Brazilian phosphatic ores; Romanian Journal of Mineral Deposits; 2012, 85 (2), pp. 49-52.

Jin et al.; Extraction kinetics of phosphoric acid from the phosphoric acid-calcium chloride solution by tri-n-butyl phosphate; Industrial & Engineering Chemistry Research; Jan. 2015.

Abdalbake M et al.: "Removing the cadmium, arsenic and sulfate ions from wet process phosphoric acid", Periodica Polytechnica. Chemical Engineering, vol. 48, No. 1, Jan. 1, 2004 (Jan. 1, 2004), pp. 63-71, XP093248063, HU, ISSN: 0324-5853.

Wu Lin, Shouping, "Technical basis for the production of phosphogypsum from high-sparse coal billets", Metallurgical Industry Press, Beijing 2007, section 3.3.1.4.

Extended European Search Report for EP24215886.3 that claims priority to the same parent application as the instant application, dated Apr. 22, 2025; 10 pages.

Chinese Search Report for CN2021800788183 that claims priority to the same parent application as the instant application, dated Apr. 24, 2025, 9 pages.

Extended European Search Report for EP21898803.8 that claims priority to the same parent application as the instant application, dated Apr. 22, 2025; 9 pages.

Notice of Substantive Examination for AR corresponding application No. AR20210103233 dated Aug. 14, 2025, 9 pages.

International Search Report and Written Opinion for PCT/SE2021/051165 that is the parent application to the instant application; dated Feb. 4, 2022; 11 pages.

Habashi et al: The hydrochloric acid for phosphate rock, J. Chem. Tech. Biotechnology, 1987, 38, 115-126.

Feldmann et al.: Influence of Impurities on Crystallization Kinetics of Calcium Sulfate Dihydrate and Hemihydrate in Strong HCl—CaCl2 Solutions, Ind. Eng. Chem. Res. 2013, 52, 6540 −6549.

Abdalbake et al.; Removing the Cadmium Arsenic and Sulfate Ions from Wet Process Phosphoric Acid; May 17, 2004; 9 pages.

Abdel-Gjafar et al;, ScienceDirect; Hydrometallurgy, Purification of high iron wet-process phosphric acid via oxalate precipitation method; vol. 184, Mar. 2019, pp. 1-8.

Al-Othman et al., Gypsum crystallization and hydrochloric acide regeneration by reaction of calcium chloride solution with sulfuric acid; www.elsevier.com/locate/hydromet; Hydrometallurgy 96 (2009) pp. 95-102.

Chen et al., Journal of Chemical & Engineering Data, pubs.acs.org/jced; Efficient Extraction of Phosphoric Acid with a Trialkyl Amine-Based Solvent Mixture; J. Chem. Eng. Data 2016, 61, pp. 438-443.

Feldmann et al., Influence of Impuriuties on Crystallization Kinetics of Calcium Sulfate Dihydrate and Hemihydrate in Strong HCl—CaCl2 Solutions; pubs.acs.org/IECR; Ind. Eng. Chem. Res. 2013, 52, pp. 6540-6549.

Gilmour, Rodney; Phosphoric Acid; Purification, Uses, Technolgoy and Economics; CRCPress.com; Copyright 2014; 112 pages.

Habashi, Fathi, "Solvent Extraction in the Phosphate Fertilizer Industry"; Department of Mining and Metallurgy; EPD Congress 1998; 18 pages.

Habashi, Fathi et al., The Hydrochloric acid route for phosphate rock; www.researchgate.net/publication/227891692; Apr. 2007; 13 pages.

Jin et al., Solvent Extraction of Fe3+ from the hydrochloric acid route phosphroic acid by D2EHPA in kerosene; Journal of Industrial and Engineering Chemistry 20 (2014) pp. 3446-3452.

May et al., Hydrochloric Acid Digestion and Solvent Extraction of Western Phosphates; U.S. Bureraru of Mines (1976); 32 pages.

Pereira, Fernando; Production d'acide phosphrique par attaque chlorhydrique de minerais phosphates avec reduction des nuisances environmenales et recuperation des terres rares en tant que sous-produits; Geochimie. Ecole Nationale Supérieure des Saint-Etienne, 2003; 233 pages.

Sato, Taichi, Liquid-liquid Extraction of Iron (III) from Hydrochloric Acid Solutions by Tributyl Phospate; vol. 118, 2002; p. 612-616.

Swedish Search Report for SE2051374-3 filed Noveber 25, 2020 that is the parent application to the instant application; Apr. 29, 2021; 2 pages.

Zhang et al., Separation of H3PO4 from HCl-wet-processing phosphate rocks leach liquor by TBP: Extraction equilibria and mechanism study; Separation and Purification Technology 249 (2020) 117156; 11 pages.

Sadeghi, et al.; Separation of Fe (III) from chloride solution by solvent extraction method and Tri-n-butyl phosphate (TBP); ISEC2014—International Solvent Extraction Conference; Sep. 7-11, 2014; 8 pages.

Opposition to ES2013211 list of citations; Apr. 16, 1990, one page.

Solcitud Nacional CL202401269. EasyMining Sweden AB. Sep. 13, 2024; 28 pages.

Solicitud Nacional CL201601334. (BE) Ecophos S.A. Nov. 24, 2016; 188 pages.

Chile Office Action for Chilean Application No. 202301498 that claims priority to the same parent application as the instant application; dated Dec. 2, 2025; 10 pages.

Chile Search Report for Chilean Application No. 202301498 that claims priority to the same parent application as the instant application; dated Dec. 2, 2025; 3 pages.

* cited by examiner

FROM STEP S10

FROM STEP S20

FROM STEP S30

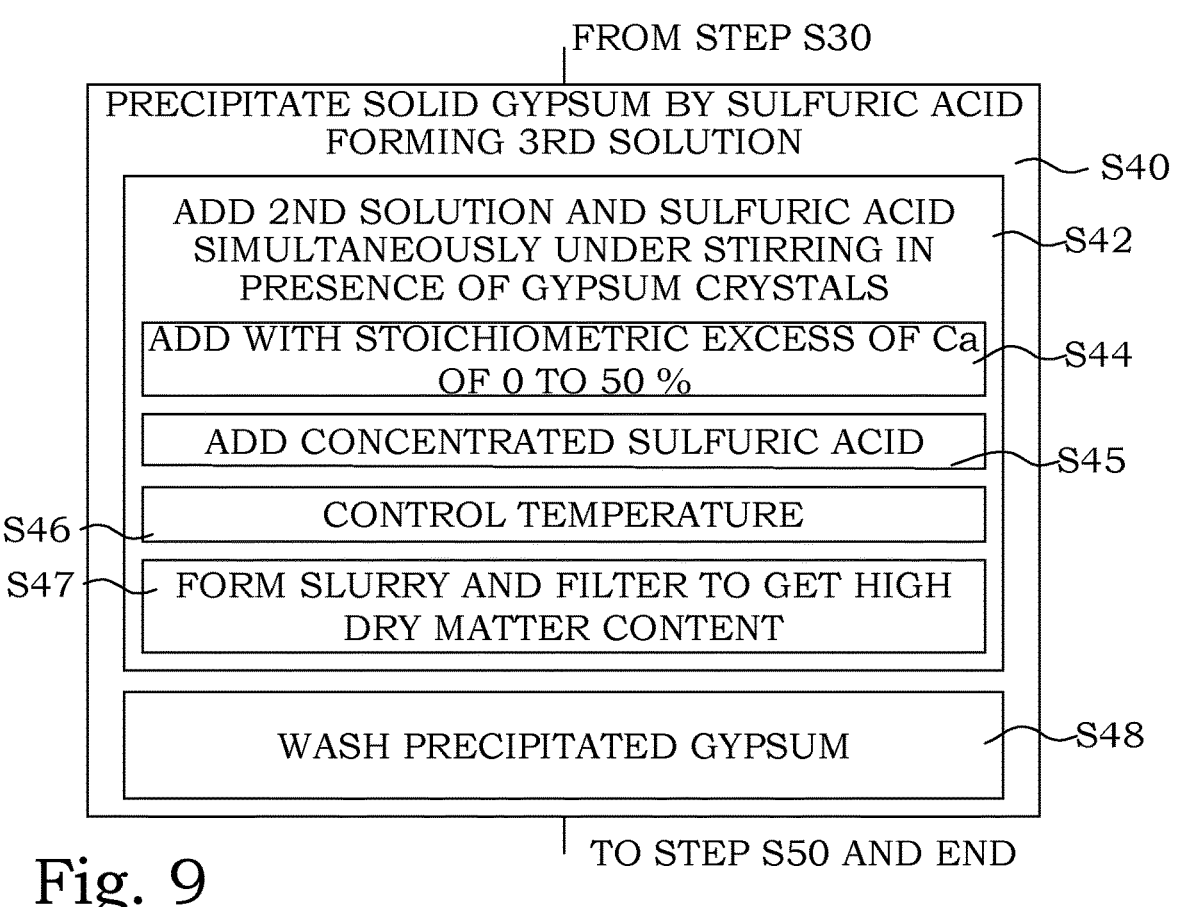

PRECIPITATE SOLID GYPSUM BY SULFURIC ACID FORMING 3RD SOLUTION — S40

ADD 2ND SOLUTION AND SULFURIC ACID SIMULTANEOUSLY UNDER STIRRING IN PRESENCE OF GYPSUM CRYSTALS — S42

ADD WITH STOICHIOMETRIC EXCESS OF Ca OF 0 TO 50 % — S44

ADD CONCENTRATED SULFURIC ACID — S45

CONTROL TEMPERATURE — S46

FORM SLURRY AND FILTER TO GET HIGH DRY MATTER CONTENT — S47

WASH PRECIPITATED GYPSUM — S48

TO STEP S50 AND END

Fig. 9

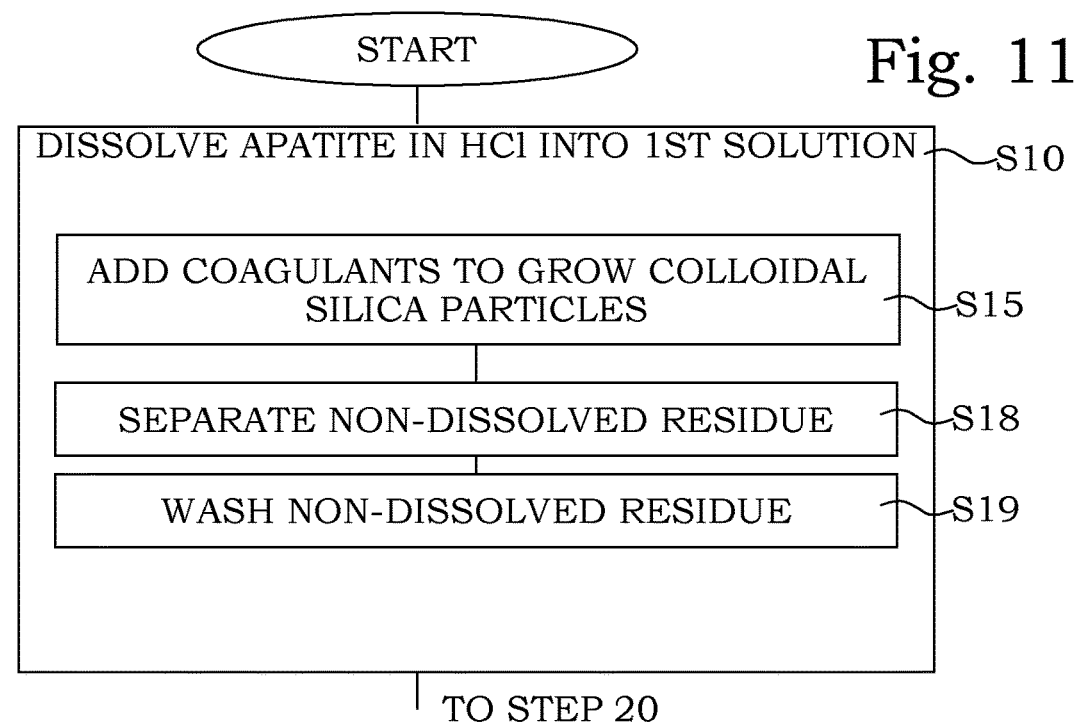

Fig. 11

START

DISSOLVE APATITE IN HCl INTO 1ST SOLUTION — S10

ADD COAGULANTS TO GROW COLLOIDAL SILICA PARTICLES — S15

SEPARATE NON-DISSOLVED RESIDUE — S18

WASH NON-DISSOLVED RESIDUE — S19

TO STEP 20

FROM STEP S10

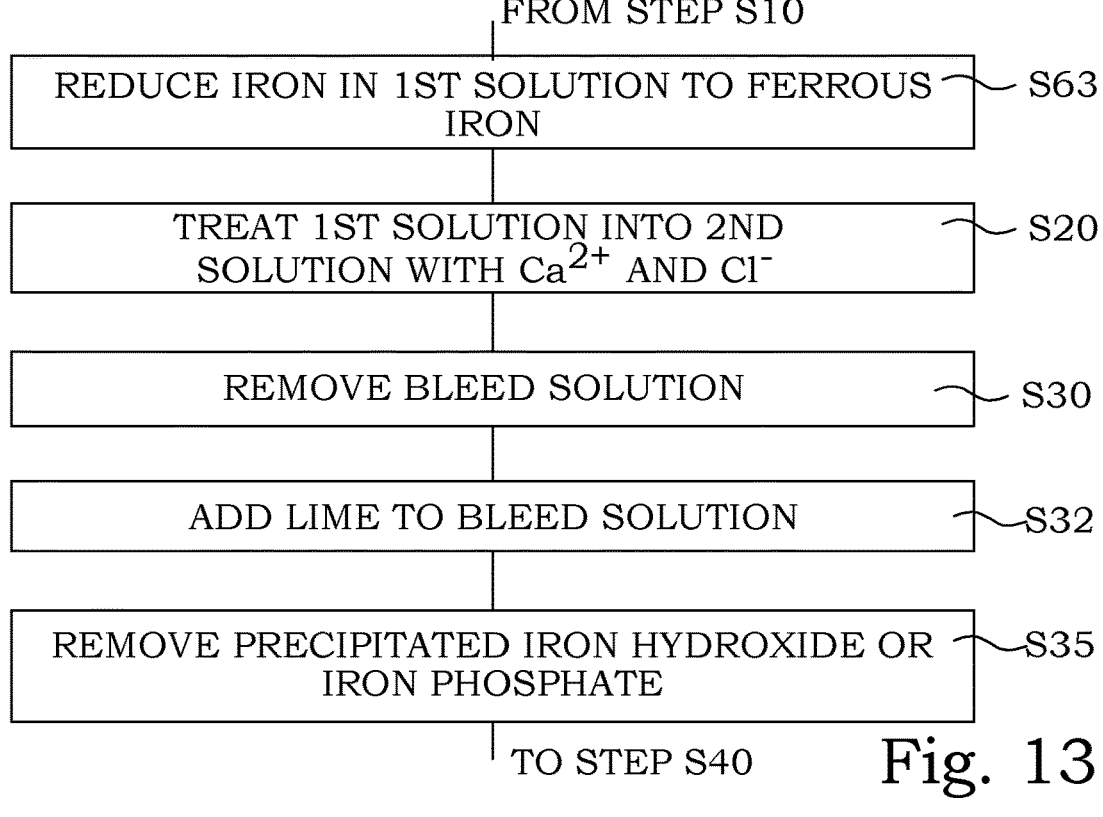

REMOVE IRON — S60

ADD OXIDIZING AGENT — S61

EXTRACT FERRIC IRON BY TBP SOLVENT EXTRACTION — S62

TO STEP S20

Fig. 12

FROM STEP S10

REDUCE IRON IN 1ST SOLUTION TO FERROUS IRON — S63

TREAT 1ST SOLUTION INTO 2ND SOLUTION WITH $Ca^{2+}$ AND $Cl^-$ — S20

REMOVE BLEED SOLUTION — S30

ADD LIME TO BLEED SOLUTION — S32

REMOVE PRECIPITATED IRON HYDROXIDE OR IRON PHOSPHATE — S35

TO STEP S40

Fig. 13

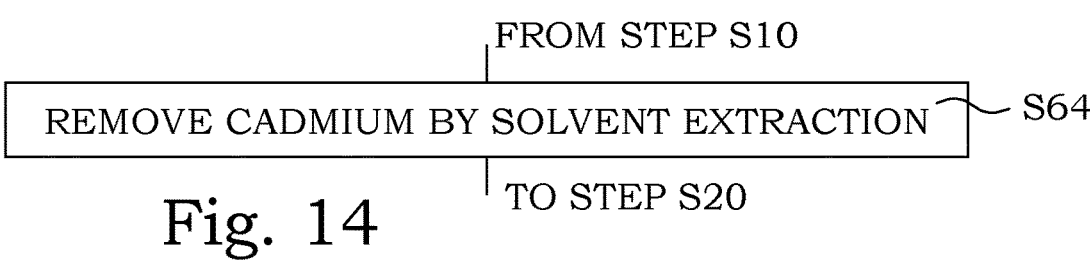

FROM STEP S10

REMOVE CADMIUM BY SOLVENT EXTRACTION — S64

TO STEP S20

Fig. 14

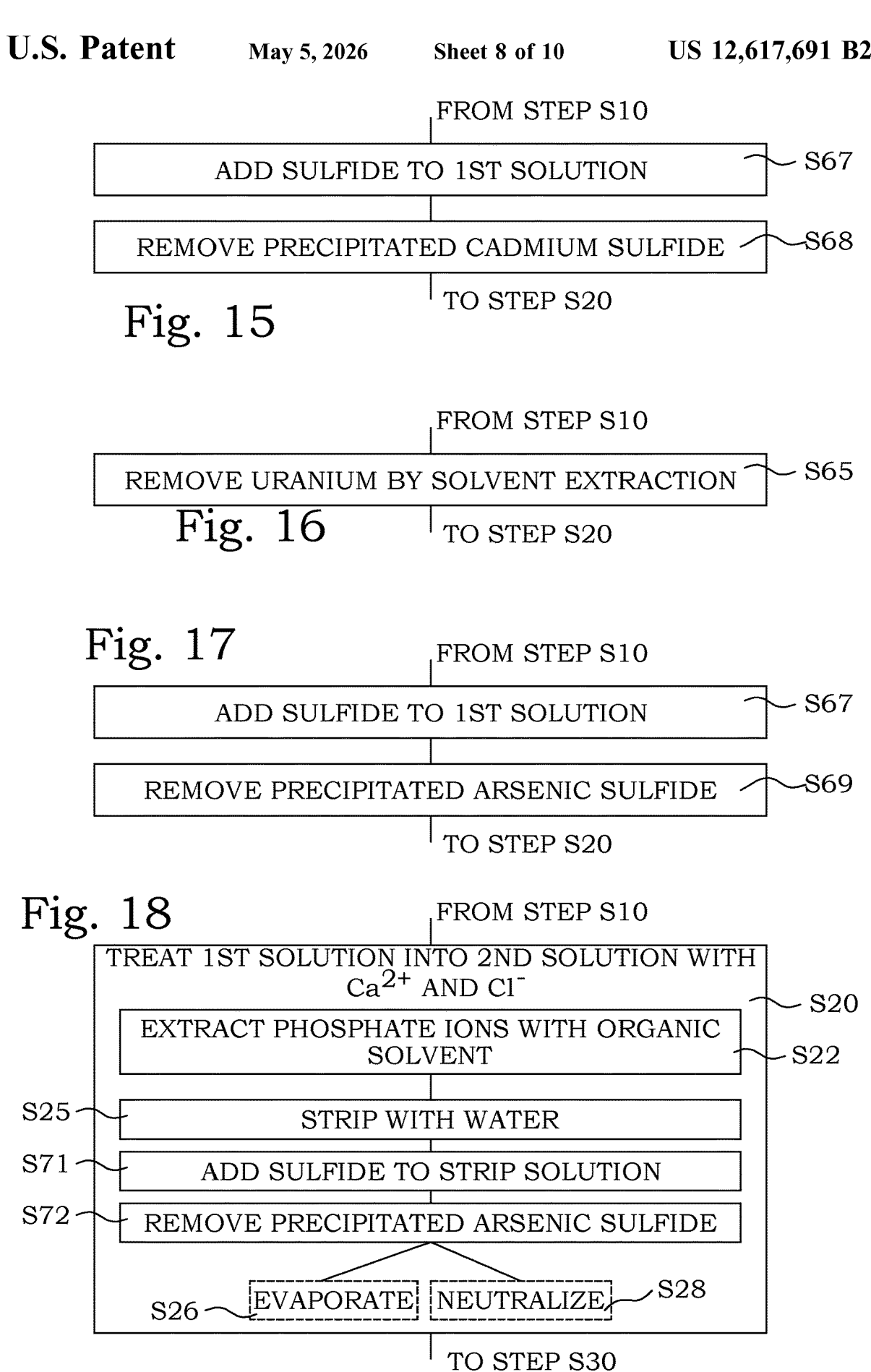

FROM STEP S10

ADD SULFIDE TO 1ST SOLUTION — S67

REMOVE PRECIPITATED CADMIUM SULFIDE — S68

TO STEP S20

Fig. 15

FROM STEP S10

REMOVE URANIUM BY SOLVENT EXTRACTION — S65

Fig. 16       TO STEP S20

Fig. 17       FROM STEP S10

ADD SULFIDE TO 1ST SOLUTION — S67

REMOVE PRECIPITATED ARSENIC SULFIDE — S69

TO STEP S20

Fig. 18       FROM STEP S10

TREAT 1ST SOLUTION INTO 2ND SOLUTION WITH $Ca^{2+}$ AND $Cl^-$ — S20

EXTRACT PHOSPHATE IONS WITH ORGANIC SOLVENT — S22

S25 — STRIP WITH WATER

S71 — ADD SULFIDE TO STRIP SOLUTION

S72 — REMOVE PRECIPITATED ARSENIC SULFIDE

S26 — EVAPORATE    NEUTRALIZE — S28

TO STEP S30

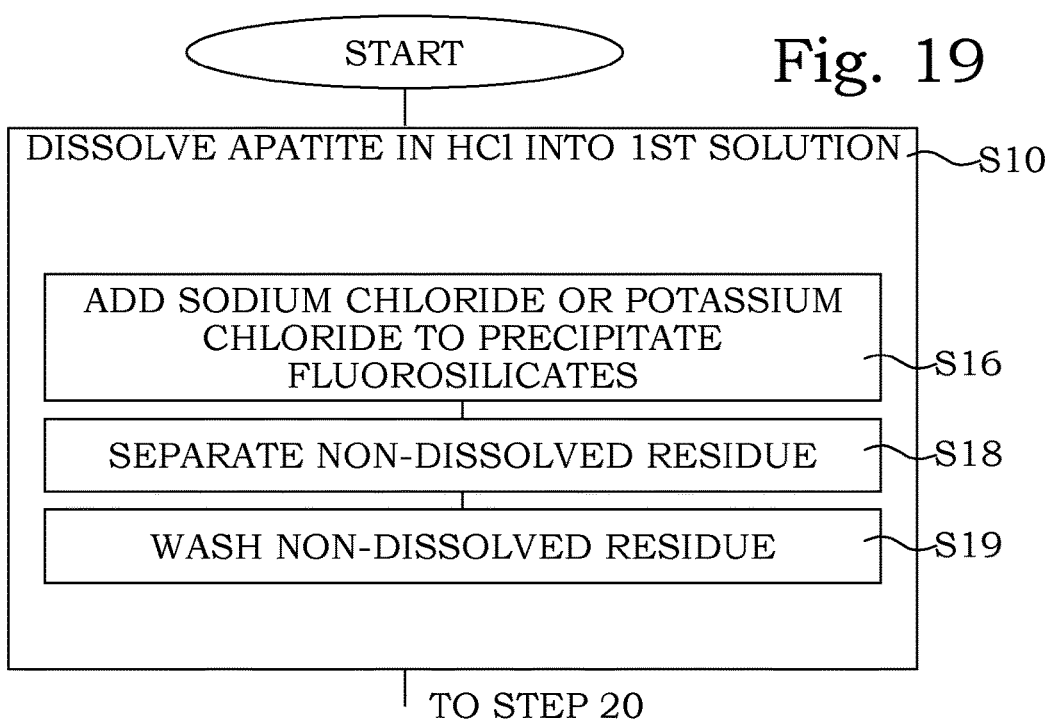

Fig. 19

START

DISSOLVE APATITE IN HCl INTO 1ST SOLUTION — S10

ADD SODIUM CHLORIDE OR POTASSIUM CHLORIDE TO PRECIPITATE FLUOROSILICATES — S16

SEPARATE NON-DISSOLVED RESIDUE — S18

WASH NON-DISSOLVED RESIDUE — S19

TO STEP 20

Fig 20

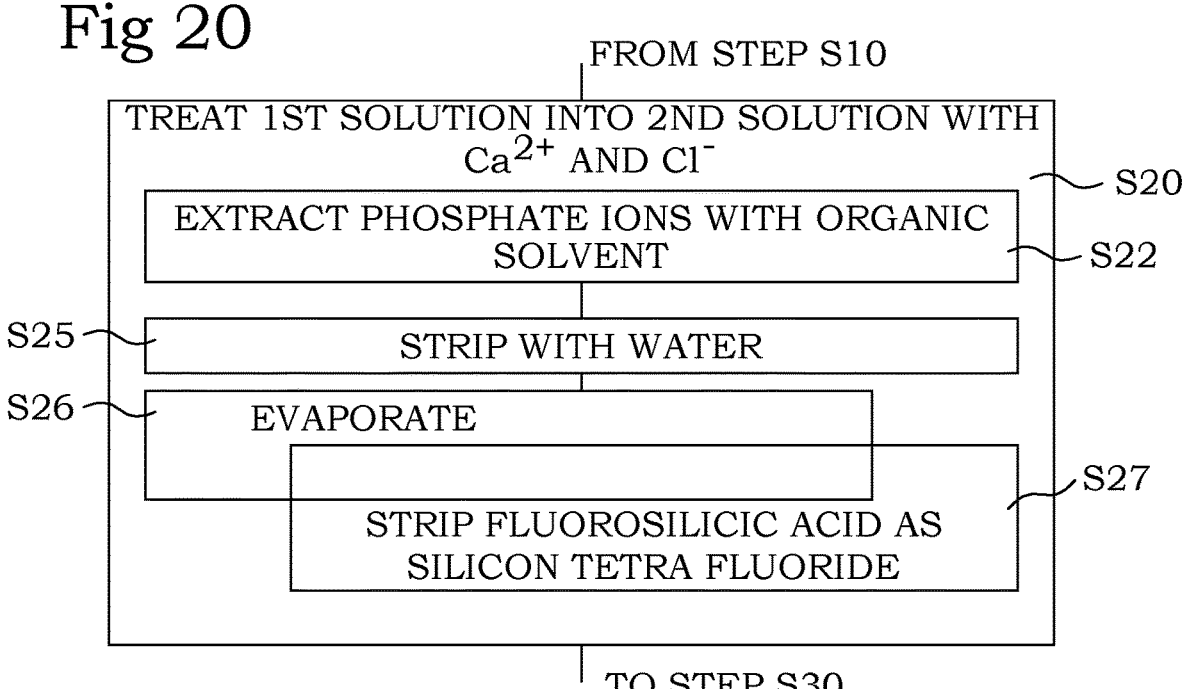

FROM STEP S10

TREAT 1ST SOLUTION INTO 2ND SOLUTION WITH $Ca^{2+}$ AND $Cl^{-}$ — S20

EXTRACT PHOSPHATE IONS WITH ORGANIC SOLVENT — S22

S25 — STRIP WITH WATER

S26 — EVAPORATE

STRIP FLUOROSILICIC ACID AS SILICON TETRA FLUORIDE — S27

TO STEP S30

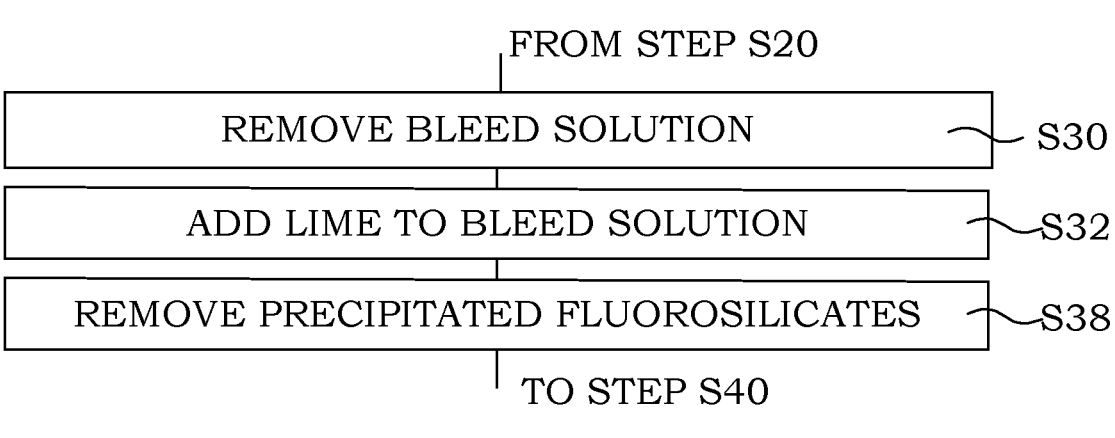

FROM STEP S20

| | |
|---|---|
| REMOVE BLEED SOLUTION | S30 |
| ADD LIME TO BLEED SOLUTION | S32 |
| REMOVE PRECIPITATED FLUOROSILICATES | S38 |

TO STEP S40

Fig. 21

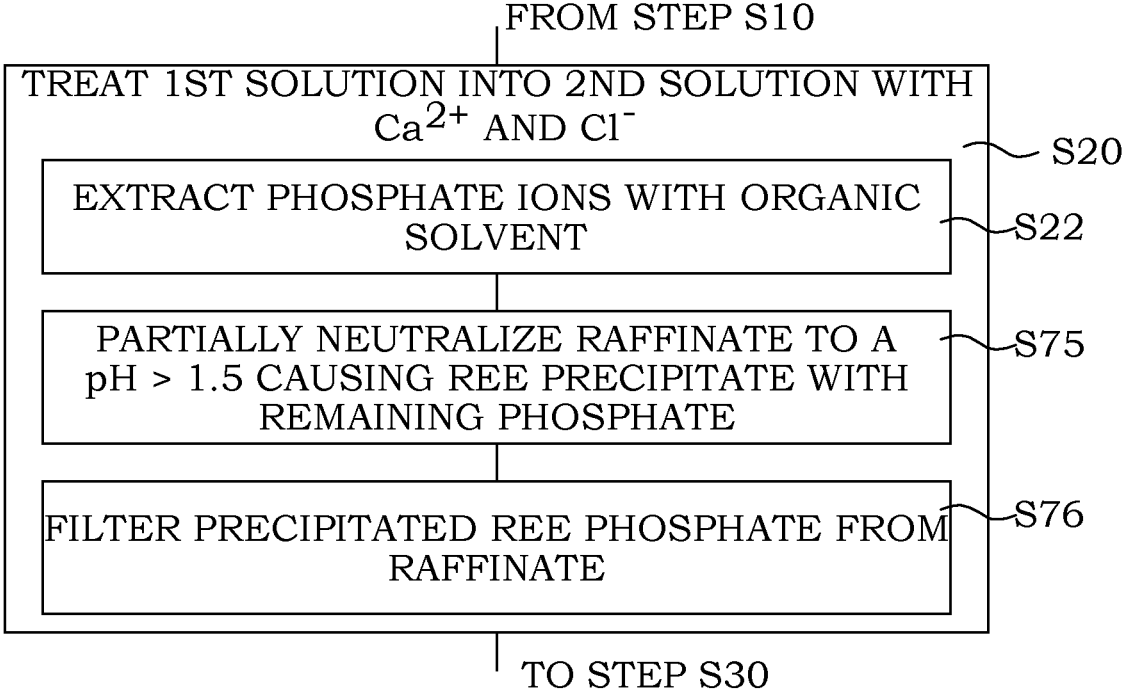

FROM STEP S10

TREAT 1ST SOLUTION INTO 2ND SOLUTION WITH $Ca^{2+}$ AND $Cl^{-}$ — S20

EXTRACT PHOSPHATE IONS WITH ORGANIC SOLVENT — S22

PARTIALLY NEUTRALIZE RAFFINATE TO A pH > 1.5 CAUSING REE PRECIPITATE WITH REMAINING PHOSPHATE — S75

FILTER PRECIPITATED REE PHOSPHATE FROM RAFFINATE — S76

TO STEP S30

Fig. 22

RECOVERY OF COMMERCIAL SUBSTANCES FROM APATITE MINERAL

This patent application is a U.S. national stage filing under 35 U.S.C. § 371 of PCT International Application No. PCT/SE2021/051165 filed Nov. 23, 2021 (published as WO2022/115021 on Jun. 2, 2022), which claimed priority to and the benefit of Swedish Patent Application 2051374-3 filed Nov. 25, 2020. The entire contents of these applications are incorporated herein by reference.

TECHNICAL FIELD

The present technology relates in general to methods and arrangements for handling apatite minerals, and in particular to methods and arrangements for separating at least phosphorus from apatite minerals.

BACKGROUND

Large quantities of phosphorus end up in the beneficiation tailings from iron ore processing in Sweden. Phosphorus is an undesired component in the final pellets and therefore it is typically separated during the beneficiation process. The separated phosphorus is typically in the form of apatite mineral of magmatic origin. The phosphorus concentration in the beneficiation waste is typically a few percent by weight, which is of equal magnitude to e.g. the phosphorus concentration in the sole phosphate mine in Europe, in Finland. Like the phosphate mine in Finland, the ore must be upgraded by e.g. flotation to form a high-grade apatite concentrate, having about 15% phosphorus by weight, suitable for further processing. Apatite concentrate has been commercially produced in Sweden from mine tailings in Malmberget and Grängesberg by different companies, but the operations ended in the 1980's mainly because of economic reasons.

In recent years there has been a renewed interest in exploring phosphorus reserves since phosphorus is listed as a critical raw material for the EU. Beside existing mine tailings, there are several apatite ores mainly in the north of Sweden that can be exploited in the future. In addition to phosphorus, the Swedish apatite minerals have a significant content (ca 0.5-0.9%) of rare earth elements, which is interesting to recover for use in high tech applications.

However, in order to upgrade apatite concentrate to phosphorus products such as e.g. phosphoric acid or ammonium phosphates, in particular with the additional requirement to recover the rare earth elements, several obstacles have to be handled. These obstacles cannot be overcome by state-of-the-art technologies. Some of the Swedish apatite is of chlorapatite form in which the chloride content exceeds the allowable limits for conventional processes (<0.1% Cl) for preventing corrosion in the phosphoric acid evaporators. The arsenic content is generally far too high to fulfill the specification for e.g. modern fertilizers. Land or sea disposal of hazardous phosphogypsum, which is a major by-product, is not considered a viable option, at least not in Sweden. Recovery of rare earth elements from apatite is not possible with conventional technologies.

The conventional way to digest apatite in the phosphate industry is by using concentrated sulfuric acid, i.e. 96-98% by weight. Most of the world production of phosphate fertilizers, about 90%, is based on the use of sulfuric acid. The reason is that sulfuric acid is a cheap commodity, easy to transport in a concentrated form, and enables easy separation of calcium from phosphoric acid in the form of gypsum. Several gypsum processes exist such as the dihydrate and hemihydrate processes and combination processes such as hemi-dihydrate.

However, the use of sulfuric acid for apatite digestion has several disadvantages. There is a limited possibility to concentrate phosphoric acid during the digestion step due to difficulties to filter gypsum from the viscous phosphoric acid at high concentrations. This limits the possible concentration of phosphoric acid from the filter to a maximum of up to about 5 M, or 40% by weight. The relatively low acid concentration means that the residual water must be removed, typically by evaporation. The process also has a strict water-balance as all the gypsum wash water must be evaporated. One of the major disadvantages of using sulfuric acid for apatite dissolution is that the residual gypsum is of low quality and not suitable for valorization in the gypsum industry. Generally, such phosphogypsum must be disposed since it is normally is considered to be too costly to clean. Technologies for cleaning phosphogypsum are based on recrystallization processes that are both chemical and energy intensive and therefore not widely used in the industry. Another disadvantage is that about 80% of the rare earth elements are incorporated into the gypsum lattice, which does not enable the recovery of rare earth elements. About one and a half ton of gypsum is generated for each ton of apatite. The disposal of phosphogypsum (considered a hazardous waste) in Sweden is not a viable option due to the difficulties in getting permits for such operation and the large costs associated with maintenance of phosphogypsum disposal ponds or sites.

Another state-of-the-art process, called the nitrophosphate process, makes use of nitric acid for the processing of rock phosphate. The nitrophosphate process has only a minor share of the world phosphorus fertilizer production, less than 10%. The nitrophosphate process is based on digestion of apatite in nitric acid followed by separation of calcium nitrate by cooling to about −10° C. The remaining mixture of phosphoric acid and nitric acid solution is then mixed with a potassium source, neutralized with ammonia and concentrated by evaporation to a sellable NPK fertilizer. A main advantage of this process is that calcium nitrate is a sellable product. The use of nitric acid for processing Swedish apatite has several disadvantages. Nitric acid is a relatively expensive acid, usually delivered in a maximum concentration of only 60% by weight. This leads to increased transportation costs due to the presence of 40% water by weight, compared to sulfuric acid which on the other hand is almost water free. In addition, the total amount of nitric acid required for removal of calcium is more than double the amount of sulfuric acid required. The reason for this is that calcium nitrate is composed of two molecules of nitrate per atom of calcium compared to only one molecule of sulfate per atom of calcium in gypsum. This means that the requirements for transport and storage of nitric acid is large compared to sulfuric acid. Therefore, transportation of large amounts of nitric acid to Sweden is probably not a viable option.

The conventional nitrophosphate route is furthermore not suitable for processing chlorapatite due to severe corrosion problems in the evaporators. Additionally, the process usually requires the setup of a complete production complex for NPK fertilizers because of a large excess of nitrogen compared to phosphorus in the nitrophosphoric acid. This production process is complex and requires large investments and is thereby not considered a reasonable solution in Sweden. In addition, if solvent extraction technology is to be used for extraction of phosphoric acid and possible subsequent production of ammonium phosphate by reacting the extracted phosphoric acid with ammonia, the use of nitric acid is problematic. Organic solvents with low water solubility cannot efficiently separate phosphoric acid from nitric acid which means that nitric acid is co-extracted to large extent together with phosphoric acid. In the end, this means that pure mono-ammonium phosphate (MAP) product cannot be produced. Instead, it will be a mixture of MAP with a large excess of ammonium nitrate. The formation of ammonium nitrate increases the need and requirement for nitric acid and ammonia considerably making logistics and transportation costs much larger. From a safety point, there is a risk for explosions in the combination of ammonium nitrate and an organic solvent which will complicate the construction of the production facilities and the permit process. Due to the above reasons mentioned, the use of nitric acid is not considered a viable solution for processing Swedish phosphate ores.

Hydrochloric acid is efficient for dissolving apatite and enables a high degree of dissolution of rare earth elements. However, the use of hydrochloric acid as a main chemical has some disadvantages. The concentration of commercial hydrochloric acid is only 36% by weight which means large costs for transportation and storage if this is the main chemical consumed. In addition, the market for calcium chloride is limited.

An alternative to the direct use of hydrochloric acid and production of calcium chloride is to regenerate the hydrochloric acid within the process using sulfuric acid and thereby operate the dissolution with hydrochloric acid but to eventually consume sulfuric acid instead. In this process, calcium chloride is converted into hydrochloric acid and gypsum by reaction with sulfuric acid. Digestion of apatite in hydrochloric acid with the generation of calcium chloride in solution, and regeneration of the hydrochloric acid by reacting the aforementioned calcium chloride with sulfuric acid has some attractive advantages. It enables processing of chlorapatite. It enables production of pure phosphoric acid and/or ammonium phosphates. It makes use of the cheaper and more concentrated sulfuric acid, and consumes the smallest amounts of required chemicals, i.e. sulfuric acid and ammonia. The process also enables a high degree of recovery for rare earth elements, enables production of gypsum of commercial quality, and reduces the production of calcium chloride. It gives an additional value of gypsum of commercial quality. Finally, it reduces safety concerns compared to the aforementioned nitrophosphate alternative, due to the reduced risk for explosions.

The main advantage of this approach is, however, that even though the actual digestion is performed with hydrochloric acid, the main acid consumed is sulfuric acid. This is because the hydrochloric acid required in the process is supplied from reacting the calcium chloride dissolved from apatite with sulfuric acid. This also produces insoluble gypsum. The advantages of using sulfuric acid are a lower price of sulfuric acid compared to other strong acids, more cost-efficient transportation of acid due to low water content of sulfuric acid, and that sulfuric acid is produced in large quantities in Sweden by both roasting of sulfide ore and by incineration of sulfur. Sweden has furthermore very large reserves of sulfide ore, mainly pyrite, which can secure long term production of sulfuric acid. An on-site own production of sulfuric acid is also possible e.g. via incineration of sulfur. Sulfur is an inert by-product which is easy to transport and to store. Incineration of sulfur also generates energy without emissions of carbon dioxide. Sulfuric acid is a common commodity in the world, and the phosphate industry is based on the use of sulfuric acid. An increase in the price of sulfuric acid will result in a corresponding increase in the price of phosphate fertilizers. Due to the aforementioned advantages, the hydrochloric acid route combined with the regeneration of hydrochloric acid using sulfuric acid therefore seems to be an interesting approach for the processing of apatite minerals.

In an article in the journal Chemical Technology and Biotechnology 1987 Habashi et al. suggested the hydrochloric acid route for processing rock phosphate. The suggested process was composed of the following process steps: a) dissolution of rock phosphate in hydrochloric acid, b) removal of fluorine by precipitating with sodium chloride, c) removal of radium by precipitating with barium chloride and sulfate, d) extraction of uranium with an organic solvent composed of 5% tributyl phosphate in hexene, e) extraction of phosphoric acid with an organic solvent composed of 100% tributyl phosphate, f) precipitation of rare earth elements from the raffinate by adjusting the pH with ammonia, and g) addition of sulfuric acid to the raffinate to precipitate gypsum and regenerate hydrochloric acid. In the article it is mentioned that sulfuric acid is directly added to the raffinate. No information is available regarding the concentration of added sulfuric acid and no information about the nature of the gypsum was given.

The above described ideas were never applied commercially. In fact, when testing the method according to the article by the present applicant some very problematic conditions were found. The reported solvent loading and extraction efficiencies for phosphoric acid were not possible to reproduce. Furthermore, production of gypsum of commercial quality in any cost-effective way was not possible to achieve. The separation of fluorine resulted in hazardous waste that is costly to dispose. The addition of ammonia to precipitate the rare earth elements resulted in contamination of ammonia in by-products such as the nondissolved residue and bleed solution. This increases the overall processing costs. Finally, the water-balance of the process was problematic, resulting in high costs for treating effluents that makes the process economically unviable.

There is thus a need to improve prior-art apatite treating processes.

SUMMARY

A general object of the present technology is to provide methods and arrangements for recovery of substances from apatite mineral that are less expensive, less complex and produce substances that are of commercial interest.

The above object is achieved by methods and devices according to the independent claims. Preferred embodiments are defined in dependent claims.

In general words, in a first aspect, a method for recovery of commercial substances from apatite mineral comprises dissolving of apatite mineral in an acid comprising hydrochloride. The dissolution gives a first liquid solution comprising phosphate ions, calcium ions and chloride ions. The first liquid solution is treated into a second liquid solution comprising calcium ions and chloride ions. This treatment in turn comprises extracting of a major part of the phosphate ions with an organic solvent. A bleed solution is removed from the second solution. Solid gypsum comprising at least 70% in a di-hydrate crystal form is precipitated from the second solution. This precipitation of solid gypsum in turn comprises adding the second solution and sulfuric acid simultaneously into a continuous-stirred reactor in the presence of gypsum crystals. The sulfuric acid has a concentration of at least 13 M. Thereby, the precipitation of solid gypsum gives a third liquid solution comprising hydrochloride.

In a second aspect, an arrangement for recovery of commercial substances from apatite mineral comprises a dissolution reactor, a treatment section, a bleed outlet and a gypsum precipitator. The dissolution reactor has an inlet for apatite mineral, an inlet for an acid comprising hydrochloride, and an outlet for a first liquid solution comprising phosphate ions, calcium ions and chloride ions. The treatment section is configured for treating the first liquid solution into a second liquid solution comprising calcium ions and chloride ions. The treatment section in turn comprises an extraction unit configured for extracting a major part of the phosphate ions using an organic solvent. The bleed outlet is connected to an outlet for the second solution from the treatment section. By this bleed outlet a bleed solution is removed from the second solution. The gypsum precipitator comprises a continuous-stirred reactor. The continuous-stirred reactor has inlets for simultaneous addition of the second solution from the treatment section and sulfuric acid, in the presence of gypsum crystals. The inlets for simultaneous addition are configured for addition of sulfuric acid having a concentration of at least 13 M. The gypsum precipitator further comprises an outlet for a third liquid solution comprising hydrochloride and an outlet for precipitated solid gypsum comprising at least 70% in a di-hydrate crystal form.

One advantage with the proposed technology is that the water-balance is significantly improved. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which:

FIG. 9 is a part flow diagram of steps of an embodiment of a method for recovery of commercial substances from apatite associated with gypsum precipitation;

FIG. 11 is a part flow diagram of steps of an embodiment of a method for recovery of commercial substances from apatite associated with silica removal;

FIG. 12 is a part flow diagram of steps of an embodiment of a method for recovery of commercial substances from apatite associated with iron removal;

FIG. 13 is a part flow diagram of steps of another embodiment of a method for recovery of commercial substances from apatite associated with iron removal;

FIG. 14 is a part flow diagram of steps of an embodiment of a method for recovery of commercial substances from apatite associated with cadmium removal;

FIG. 15 is a part flow diagram of steps of another embodiment of a method for recovery of commercial substances from apatite associated with cadmium removal;

FIG. 16 is a part flow diagram of steps of an embodiment of a method for recovery of commercial substances from apatite associated with uranium removal;

FIG. 17 is a part flow diagram of steps of an embodiment of a method for recovery of commercial substances from apatite associated with arsenide removal;

FIG. 18 is a part flow diagram of steps of another embodiment of a method for recovery of commercial substances from apatite associated with arsenide removal;

FIG. 19 is a part flow diagram of steps of an embodiment of a method for recovery of commercial substances from apatite associated with fluorine removal;

FIG. 20 is a part flow diagram of steps of another embodiment of a method for recovery of commercial substances from apatite associated with fluorine removal;

FIG. 21 is a part flow diagram of steps of yet another embodiment of a method for recovery of commercial substances from apatite associated with fluorine removal; and FIG. 22 is a part flow diagram of steps of an embodiment of a method for recovery of commercial substances from apatite associated with recovery of rare earth elements.

DETAILED DESCRIPTION

Throughout the drawings, the same reference numbers are used for similar or corresponding elements.

According to the analysis in the background section, processes based on the use of hydrochloric acid for processing apatite minerals seems to constitute a promising approach.

Figure 1:
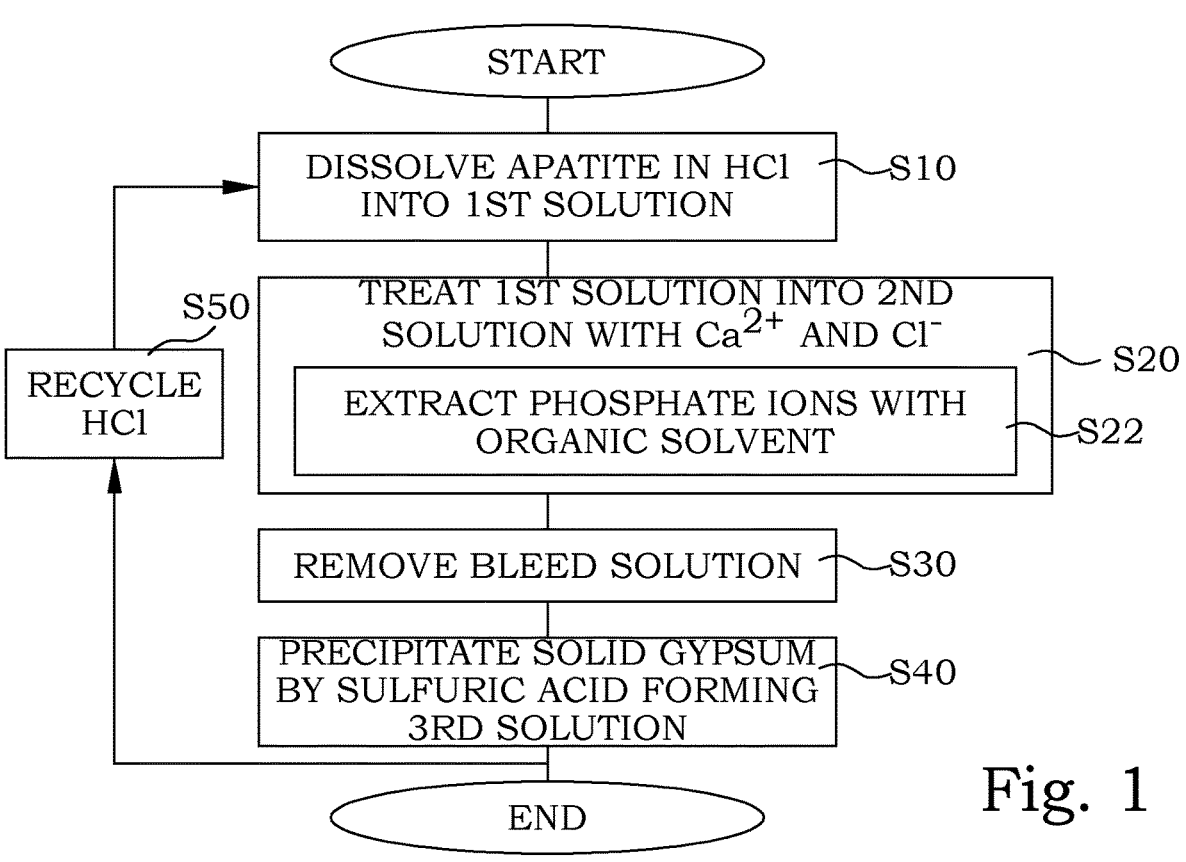
FIG. 1 is a flow diagram of steps of an embodiment of a general method for recovery of commercial substances from apatite mineral according to the hydrochloric acid route in a cyclic process.

For a better understanding of the main disadvantages of prior art, it may be useful to begin with a further discussion of the hydrochloric acid route. A main challenge when applying the hydrochloric acid route to processing apatite is the water-balance. The process is cyclic as can be seen in FIG. 1. In basic version, in step S10, apatite mineral is dissolved in an acid comprising hydrochloride. In step S20, the resulting liquid is treated into a liquid solution comprising mainly calcium and chloride ions. The treating in step 20 typically comprises step 22, in which a major part of the phosphate ions is extracted with an organic solvent. In step 40, solid gypsum is precipitated by adding sulfuric acid. The sulfuric acid also regenerates hydrochloric acid, which typically in step S50 is recirculated for a new dissolving step.

Due to the cyclic nature of the process, the water-balance is strict. Any addition of excess water needs to be removed in step S30 by a bleed in order to maintain a constant volume of liquid in the process.

However, water must be added to the process at different locations. First, there is a need for wash waters for washing of solid material taken out of the cyclic process such as the nondissolved residue, precipitated gypsum, precipitated rare earth elements or contaminants, etc. The used wash water has typically a high ion concentration since the ion concentration in the circulating process solution is high. It is environmentally unacceptable to discharge such wash waters. Since the wash waters generally are acidic and contain high levels of elements desired to recover it is generally costly to treat such wash waters by technologies such as membrane treatment, distillation, etc. and the preferred treatment is usually to recycle the wash waters back into the process which results in an addition of water to the main process.

Secondly, there is a need for addition of scrubber water to remove co-extracted ions from organic solvents used for separating phosphoric acid from calcium chloride Thirdly, there is addition of water to the process with the makeup hydrochloric acid needed. Hydrochloric acid has a maximum concentration of 36% by weight which means that substantial amount of water enters the process via addition of makeup hydrochloric acid.

Fourthly, there is a substantial addition of water into the process with the added sulfuric acid depending on its concentration. As will be discussed further in the text it is common in prior art to dilute the sulfuric acid with water to about 50% by weight before using it for gypsum precipitation. This results in substantial amount of water being added to the process.

In order to maintain a water-balance in the process, the amount of removed water from the process should equal the amount of added water. The logical way to solve the water-balance problem of the process is to take out a bleed from the process. A large bleed from the process is very costly and can render the whole process economically unviable. The bleed solution is typically highly concentrated and cannot be discharged to the environment. The bleed has a very high concentration of calcium chloride and the residual phosphorus content may be significant as surprisingly was found by the present applicant and will be later discussed in more details. The loss of phosphorus through the bleed is environmentally and economically unacceptable.

Phosphorus can be precipitated as calcium phosphate by addition of limestone to the bleed. The calcium phosphate then can be recycled to the dissolution reactor. The phosphorus depleted calcium chloride can also be crystallized to form a product. However, the above described treatment increases the chemical consumption of input materials such as limestone, sulfuric acid, hydrochloric acid and generates even more gypsum. Crystallization of calcium chloride is highly energy intensive and the market for calcium chloride is limited. In addition, the use of limestone results in increased carbon dioxide emissions, which is desired to keep to a lower level for environmental reasons.

There is a need for a cost-effective method for processing apatite minerals in which gypsum of commercial quality can be produced to avoid its disposal, enable production of high value phosphorus products such as phosphoric acid or ammonium phosphates, enable separation of dissolved iron, enable separation of arsenic, enable recovery of fluorine as valuable product and enable recovery of rare earth elements.

Precipitation of gypsum from calcium chloride by use of sulfuric acid is, as such, known in prior art. For instance, the published US patent application US 20170291826 A1 describes a method for production of high concentration hydrochloric acid from calcium chloride feed streams by crystallization. The focus was the production of the more valuable gypsum alpha hemihydrate using concentrated sulfuric acid. The crystallization of gypsum alpha hemihydrate leaves a large portion of the water in the solution, which makes the water-balance problem even worse.

In the patent, it is also mentioned that gypsum dihydrate can be produced. However, the requisites for this is to keep the concentration of sulfuric acid low and keep the operations at low temperatures as well. The lower concentration of the used sulfuric acid is also detrimental for the water-balance. The method according to US 20170291826 A1 was primarily intended for metal ores and was not applied for processing of apatite minerals.

According to the present technology, and in absolute contrast to what was discussed in US 20170291826 A1, gypsum in a dihydrate crystal form will be generated while still using concentrated or at least high-concentrate sulfuric acid, as a part of a hydrochloric acid route for processing apatite minerals.

This approach thereby enables the use of the hydrochloric acid route for processing apatite minerals in a way that improves the water-balance of the whole process and thereby make the whole process economic viable. This will be described in more detail in the following description.

The present technology provides an improved way to operate the hydrochloric acid processing of apatite minerals that enables to: a) recover phosphorus as a high value product such as phosphoric acid or ammonium phosphates, b) produce gypsum of commercial quality, c) improve the overall cost-effectiveness of the process by enabling to minimize the bleed from the process, and preferably also d) enable to separate arsenic, iron as well as recover fluorine and rare earth element in valuable forms in a cost-effective way and without the contamination of other by-products with chemicals such as ammonia. This is obtained by specific operational conditions as will be described in detail further in the description.

Some often used terminology in the present disclosure is to be interpreted as follows:

Solvent—A liquid phase, typically organic, which preferentially dissolves extractable solute species from an aqueous solution.

Extractant—An active component, typically organic, of a solvent enabling extraction.

Solvent extraction (liquid-liquid extraction)—The separation of one or more solutes from a mixture by mass transfer between immiscible phases in which at least one phase typically is an organic liquid.

Stripping—The displacement from the solvent of the ions or acids removed from the process solution to make the solvent ready for reuse.

Scrubbing—The selective displacement from the solvent of certain extracted species. This is typically performed before stripping of the final product.

Diluent—A liquid, typically organic, in which an extractant is dissolved to form a solvent.

Raffinate—An aqueous phase from which a solute has been removed by extraction.

Figures 2, 4:
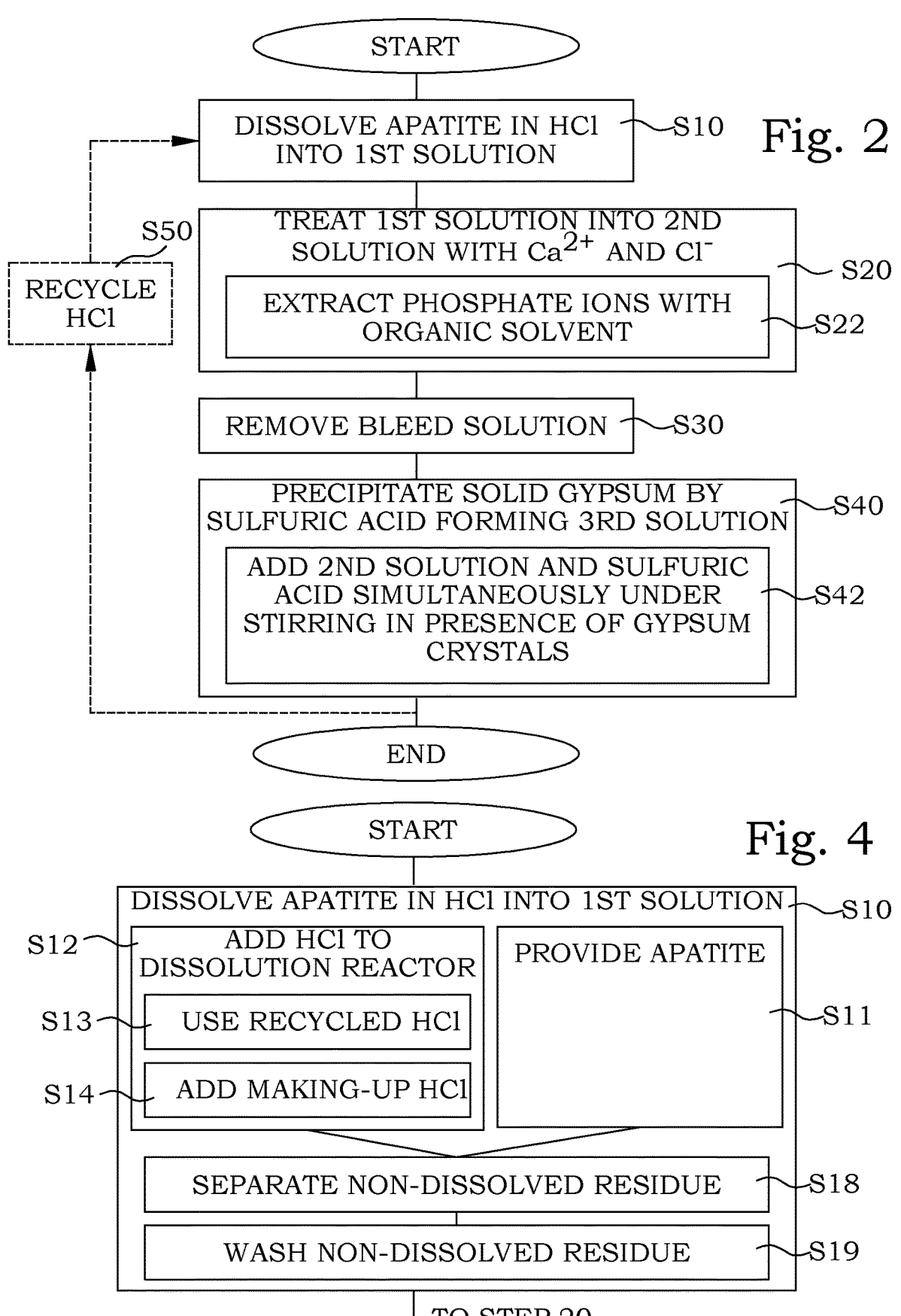
FIG. 2 is a flow diagram of steps of an embodiment of a water-conservative method for recovery of commercial substances from apatite.
FIG. 4 is a part flow diagram of steps of an embodiment of a method for recovery of commercial substances from apatite associated with dissolving of apatite.

FIG. 2 illustrates a flow diagram of steps of an embodiment of a water-conservative method for recovery of commercial substances from apatite mineral. In step S10, apatite mineral is dissolved in an acid comprising hydrochloride. This gives a first liquid solution comprising phosphate ions, calcium ions and chloride ions.

In step S20, the first liquid solution is treated into a second liquid solution comprising calcium ions and chloride ions.

The step S20 of treating in turn comprising the step S22, in which a major part of the phosphate ions is extracted with an organic solvent. Preferred embodiments will be discussed more in detail further below.

In step S30, a bleed solution is removed from the second solution.

In step S40, solid gypsum is precipitated from the second solution. The solid gypsum is at least to 70% in a di-hydrate crystal form. The step S40 of precipitating solid gypsum in turn comprises the step S42, in which the second solution and sulfuric acid simultaneously are added into a continuous-stirred reactor in the presence of gypsum crystals. Thereby the precipitation of solid gypsum gives a third liquid solution comprising hydrochloride.

Preferably, in step S50, at least a part of the third liquid solution is recycled to be used in a subsequent step S10 of dissolving apatite mineral as at least a part of the acid comprising hydrochloride.

The first step S10 in the process is the dissolution of the apatite mineral in hydrochloric acid. The commercial applications of dissolving apatite in hydrochloric acid are limited since the main route of processing rock phosphate is by direct dissolution with sulfuric acid. However, there are some commercial applications of dissolving rock phosphate in hydrochloric acid with the purpose of producing di-calcium phosphate for use as a feed additive This is e.g. described in Taha et al., 2014, "Dissolution kinetics of phosphate rocks, precipitation of DCP and production of pure phosphoric acid", LAP LAMBERT Academic Publishing ISBN:978-3-659-12390-0. It is known in these applications to dissolve the rock phosphate with a dilute hydrochloric acid in a liquid to solid ratio of about 5 (L/kg). This results in high dissolution rates for the phosphorus. There is no demand to operate at higher concentration since the water solubility of di-calcium phosphate is low and it can be precipitated efficiently from dilute solutions in a later step. It is also known to add sulfuric acid to the solution after precipitation of di-calcium phosphate to precipitate gypsum and regenerate hydrochloric acid. The sulfuric acid is directly added to the filtrate from the separation of di-calcium phosphate. Since the solution is relatively dilute, the gypsum formed has such characteristics that enable a separation by filtration. However, these circumstances are not the same as in the present system and other approaches must therefore be used.

In the presently discussed process, the aim is not to precipitate phosphorus as di-calcium phosphate but instead to extract phosphoric acid from the leachate using solvent extraction in a next step. The high liquid-to-solid ratio during dissolution of rock phosphate in hydrochloric acid according to the state-of-the art is thereby undesired since it results in relatively low concentrations of calcium chloride and phosphoric acid, which make solvent extraction systems for phosphoric acid very large, inefficient and costly. At the same time this influences the water-balance detrimentally.

Figure 3:
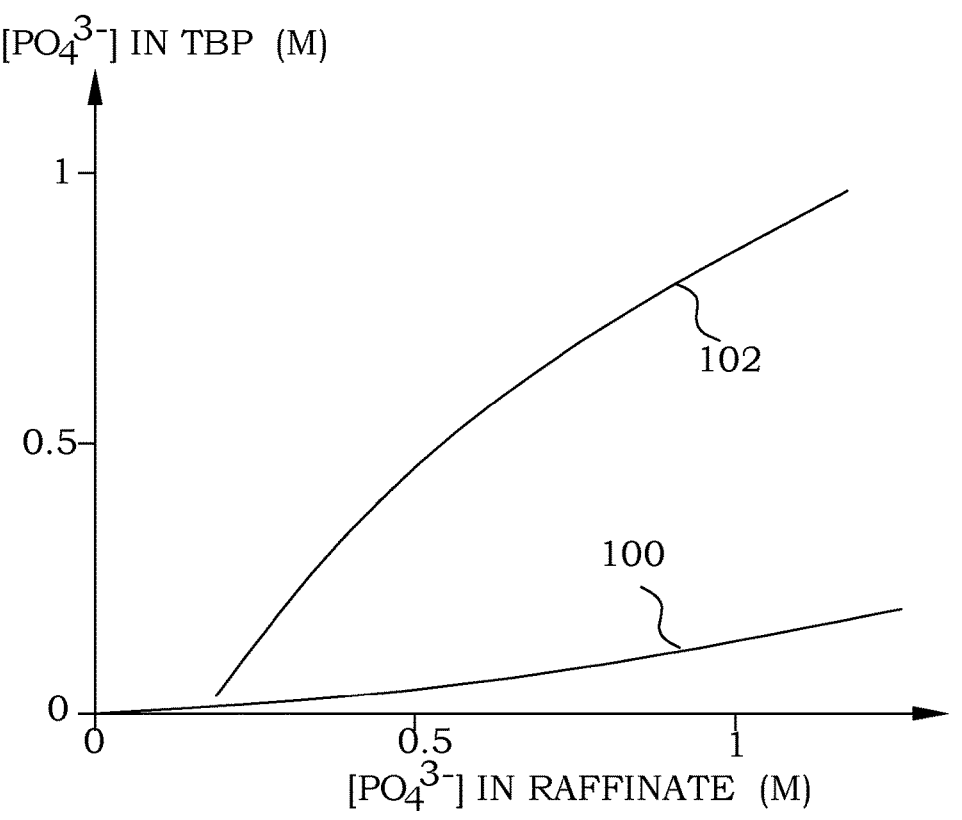
FIG. 3 are extraction isotherms for phosphoric acid with and without a background of calcium chloride.

Calcium chloride has a great salting out effect on the extraction of phosphoric acid with organophosphorus compounds such as tributyl phosphate (TBP). This is illustrated in FIG. 3. The curve 100 illustrates the concentration in TBP when being exposed to pure phosphoric acid. The curve 102 illustrates the concentration in TBP when being exposed for pure phosphoric acid with a 3M artificial leachate of $CaCl_2$ as background. This means that extraction of phosphoric acid is more effective at high concentration of phosphoric acid and calcium chloride. Therefore, it is desired to have an as high as possible concentration in the leachate. A logical way to increase the concentration of the leachate is thus by dissolving apatite at lower liquid-to-solid ratio while using more concentrated hydrochloric acid.

However, it was found by the present inventors that during dissolution of apatite mineral in hydrochloric acid at ambient temperatures when the liquid-to-solid ratio is lowered, the dissolution efficiency of phosphorus also decreases. Some results are presented in Table 1. Therefore, the optimal liquid-to-solid ratio to obtain a concentrated solution and still obtain a high dissolution rate for phosphorus seems to be around 3, which gives a leachate containing about 3 M calcium chloride and 1.7 M phosphoric acid. It is of course possible to further optimize the dissolution by e.g. dissolving at elevated temperatures, which can allow to lower the liquid-to-solid ratio and still achieve sufficient dissolution of phosphorus. Also, higher concentrations of hydrochloric acid may improve the dissolution.

TABLE 1

| Dissolution yields expressed as dissolution degree for phosphorus from apatite (DD) for phosphorus as a function of liquid-to-solid ratio in the dissolution reactor using 6M HCl and one-hour dissolution time. | | |
| --- | --- | --- |
| | liquid-to-solid ratio = 3 | liquid-to-solid ratio = 3.3 | liquid-to-solid ratio = 3.6 |
| DD (%) | 93 | 94 | 97 |

In other words, in one embodiment, the step S10 of dissolving apatite mineral is performed at a liquid-to-solid ratio between 1 and 5, preferably between 2.8 and 3.6.

Preferably, as illustrated in FIG. 4, step S10 comprises the part step S11 of providing apatite mineral into a dissolution reactor and the part step S12 of adding hydrochloric acid to the dissolution reactor. As described above, preferably one or both steps comprise controlling of the added amounts in order to reach the preferred liquid-to-solid ratios. Further preferably, step S12 comprises part step S13 of using solution recirculated from step S40, and S14 of adding makeup HCl from an external source. Together, the steps S13 and S14 provides HCl in the required amount.

After dissolution of the apatite in hydrochloric acid, the nondissolved residue is removed by filtration. It is possible to add filter aid materials to improve the filtration operation. The filtrated nondissolved residues are preferably washed, preferably by water, in order to remove remaining acid components. The wash water is typically re-entered into the first solution. In other words, preferably, step S10 comprises the part step S18 of separating nondissolved residues and the part step S19 of washing the nondissolved residues.

Before and/or after filtration of the nondissolved residue, the leachate may preferably be pretreated before subjected to solvent extraction. This will be addressed further below.

The next step according to the embodiment of FIG. 2 is to treat the first solution, step S20, to separate phosphoric acid from the calcium chloride. This is performed by using solvent extraction in step S22. Several water-immiscible solvents are suggested in the literature as suitable for extraction of phosphoric acid. The suggested solvents can generally be divided into the following groups:

a) alkyl phosphates such as tributyl phosphate, b) amines such as tri-n-octylamine, c) alcohols such as isoamyl alcohol, n-amyl alcohol, cyclohexanol, methyl cyclohexanol, tertiary amyl alcohol, iso-butanol, n-butanol, heptanol, d) ketones such as methyl-isobutyl ketone, methyl propyl ketone, diethyl ketone, methyl ethyl ketone, methyl-n-butyl ketone, e) amides such as butyl acetamide, f) aldehydes such as benzaldehyde, g) esters such as ethyl acetate, butyl acetate, amyl acetate, cyclohexanone, and h) ethers such as diethyl ether, di-n-amyl ether, and glycol ethers such as di-ethylene glycol.

All the solvents mentioned above are classified as water immiscible. However, most of the mentioned solvents are in fact somewhat soluble in aqueous solutions, particularly in the presence of acids, salts and/or other chemical species, and some are more soluble than others. This can result in contamination of both aqueous streams and the final product with traces of the solvent. A high water-solubility usually requires recovery of dissolved solvent from aqueous steams by distillation which is costly and complex. For example, n-butanol has a water solubility of ca 90 grams per liter at room temperature. Several of the mentioned solvents also have other disadvantages in addition to high solubility such as flammability and or explosion risk, e.g. di-isopropyl ether.

Furthermore, several of the solvents mentioned show limited extraction capacity for phosphoric acid below a certain threshold concentration. This means that the feed phosphoric acid initially must have a high concentration, which usually requires concentration of the acid by water evaporation. In addition, only partial extraction of phosphoric acid is possible with such solvents. A typical example for a solvent with a significant threshold concentration for phosphoric acid extraction is methyl isobutyl ketone. In general, ethers, esters and selected ketones have a significant threshold concentration for phosphoric acid extraction and are therefore not suitable for extracting phosphate from low concentration sources, and therefore not suitable for the fairly low concentrations (about 1.5 M $H_3PO_4$), which is the case of the systems presently targeted.

Tributyl phosphate (TBP) is commonly used in the phosphate industry for purification of phosphoric acid by liquid-liquid extraction, also denoted as solvent extraction. Tributyl phosphate is non-flammable, has low toxicity and a low solubility in water of ca 0.4 grams per liter at room temperature. Furthermore, the solubility decreases with increasing temperature and increased phosphoric acid concentration. Tributyl phosphate also has a reasonably constant distribution coefficient, i.e. ability for extracting phosphoric acid, down to low phosphoric acid concentrations. Due to the relatively high density of tributyl phosphate (ca 0.98 kg/L) it is commonly mixed with a diluent, such as aliphatic kerosene, in order to improve the physical separation between TBP and the water phase. However, applied to the solutions targeted here, in contact with a concentrated salt solution such as a calcium chloride, the density difference can be sufficient to avoid the use of a diluent if stripping can be run in a way that enables efficient phase separation.

Tributyl phosphate enables extraction of phosphoric acid in preference to dissolved salts such as chlorides and in preference to dissolved acids such as hydrochloric acid or sulfuric acid. The presence of dissolved salts or acids in fact enhances extraction of phosphoric acid by a salting out mechanism. However, tributyl phosphate extracts nitric acid in preference to phosphoric acid, which makes selective extraction of phosphoric acid from nitric acid impossible. In general, solvents which have a low solubility in water extract nitric acid in preference to phosphoric acid. Solvents with increased selectivity for phosphoric acid such as amyl alcohol have high water solubility and still co-extract considerable amounts of nitric acid. The main advantage of using tributyl phosphate as a solvent for extraction of phosphoric acid is the low water solubility, which enables operation without a need for distilling the solvent from aqueous streams, which is costly and complex.

It was mentioned above that many suitable solvents are soluble in water, e.g. alcohols. However, alcohols having relatively long carbon chains also have a relatively low water solubility. An alternative solvent for extracting phosphoric acid is therefore long carbon chain alcohols, e.g. heptanol, which has a solubility in water of less than 2%. If the solubility is lower than such a level, the amount of solvent following the water stream becomes reasonably low to be taken care of with relatively inexpensive and simple arrangements. Since there is very limited experience in the industry with the use of long chain alcohols, while TBP is a standard solvent used on large scale for more than 40 years, the presently preferred solvent according to the present technology is TBP.

In other words, in one embodiment, the organic solvent is tributyl phosphate.

There is very limited data in the literature regarding the use of TBP for extraction of phosphoric acid from chloride systems. The main literature known by the Applicant includes the following articles:

Habashi et al., 1987. The hydrochloric acid route for phosphate rock. Journal of Chemical Technology and Biotechnology, 1987, Vol. 38, Naito and Suzuki, 1961. The mechanism of the extraction of several proton acids by tri.n.butyl phosphate. Japan Atomic Energy Research Institute, Jin et al., 2010. Liquid-Liquid Equilibrium in the System Phosphoric Acid/Water/Tri-n-butyl Phosphate/Calcium Chloride. J. Chem. Eng. Data 55, 3196-3199, Fernando Pereira, 2013 Doctoral Thesis. Ecole Nationale Superieure Des Mines De Saint-Etienne. "Production d'acide phosphorique par attaquechlorhydrique de minerais phosphatés avec réduction desnuisances environnementales et récupération des terresrares en tant que sous-produits", Pereira and Bilal, 2013, Phosphoric acid extraction and rare earth recovery from apatites of the Brazilian phosphatic ores. Romanian Journal of Mineral Deposits, 2012, 85 (2), pp. 49-52, and Jin et al., 2015. Extraction kinetics of phosphoric acid from the phosphoric acid—calcium chloride solution by tri-n-butyl phosphate. Industrial & Engineering Chemistry Research. January 2015.

In the literature, it is descried that almost complete extraction of phosphoric acid is possible with the use of TBP as a solvent with a calcium chloride background content of about 3 M. For example, Habashi et al., 1987 stated that more than 99% of $H_3PO_4$ can be extracted in 3 stages at an organic-to-aqueous ratio of 1:1. The same statement was repeated by Pereira, 2013. However, it has surprisingly been found by the present inventors that complete extraction of phosphoric acid with TBP from apatite leachates under the above condition was not possible to achieve. The phosphoric acid concentration in experiments could only be lowered to about 0.2 M as is illustrated by the diagram in FIG. 5. The triangles and crosses correspond to experiments on two different artificial phosphate-containing apatite-like solutions, while the squares correspond to experiments on actual apatite-origin solutions. All experiments were performed as large-scale experiments. 0.2 M phosphoric acid concentration corresponds to only about 90% maximum extraction yield.

Also the loading capacities of the TBP solvent reported by e.g. Habashi et al., 1987 were not possible to reproduce. Habashi reported a loading of 3M $H_3PO_4$ in TBP in contact with 0.7 M phosphoric acid in the apatite leachate. This was clearly not possible to reproduce as can be seen from FIG. 5. Even if the organic-to-aqueous ratio was increased to 3:2 instead of 1:1 it was not possible to completely extract the phosphoric acid. Complete extraction of phosphoric acid was not possible in the experiments even if the number of contact stages was increased to 5 as can be seen in Table 2.

TABLE 2

Yield of extraction of phosphoric acid from apatite leachates as a function of -organic-to-aqueous ratio and number of contact stages

| O/A | Contact stages | $H_3PO_4$ yield (%) |
|-----|----------------|---------------------|
| 3:2 | 5 | 89 |
| 3:2 | 3 | 83 |
| 1:1 | 5 | 80 |

Figures 5, 6:
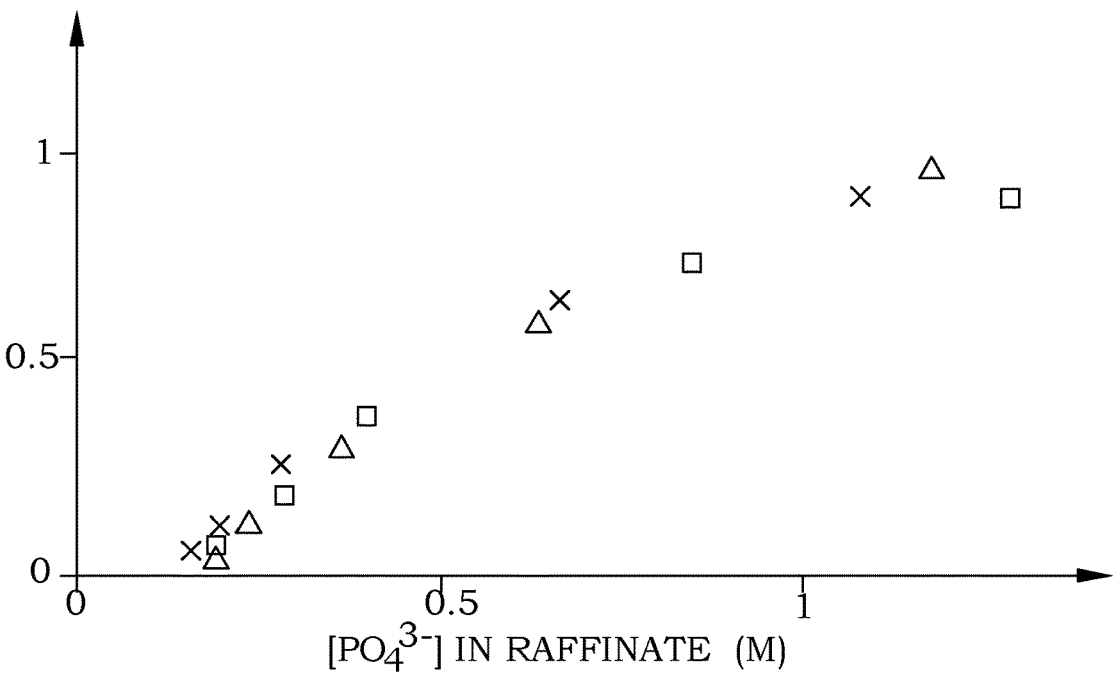
FIG. 5 is a diagram of extraction isotherms for phosphoric acid from apatite leachate.
FIG. 6 is an equilibrium curve for extraction of phosphoric acid from apatite leachate and number of contact stages required for operation in organic-to-aqueous ratio of 3:2.

The conclusion was that complete extraction of phosphoric acid is difficult to achieve, even with a very large number of contact stages as can be seen in the diagram of FIG. 6. A considerable amount of residual phosphorus has therefore to be assumed to be present in the raffinate and will follow to the subsequent steps in the process. However, preferably, less than 10 g phosphorous per liter remains in the raffinate.

In other words, in one embodiment, the step of extracting a major part of the phosphate ions is performed until the second liquid solution has a residual phosphorus content of less than 10 g P per liter.

In one embodiment, the step of extracting a major part of the phosphate ions is performed with an organic solvent at an organic-to-aqueous ratio of between 1:1 and 3:1, preferably between 7:5 and 8:5, in at least 4 contact stages, preferably at least 5 contact stages.

In one embodiment, the apatite leachate after optional pretreatment for e.g. removal of iron, as will be discussed further below, is subjected to extraction of phosphoric acid by using solvent extraction. The preferred solvent is TBP, as discussed above used as 100% or mixed with a diluent such as kerosene if required for efficient phase separation during stripping. The apatite leachate is extracted with the solvent preferably in an organic-to-aqueous ratio of preferably above 1:1 but below 3:1, preferably about 3:2, e.g. between 7:5 and 8:5. The number of contact stages are preferably at least 4 preferably at least contact stages.

Figure 7:
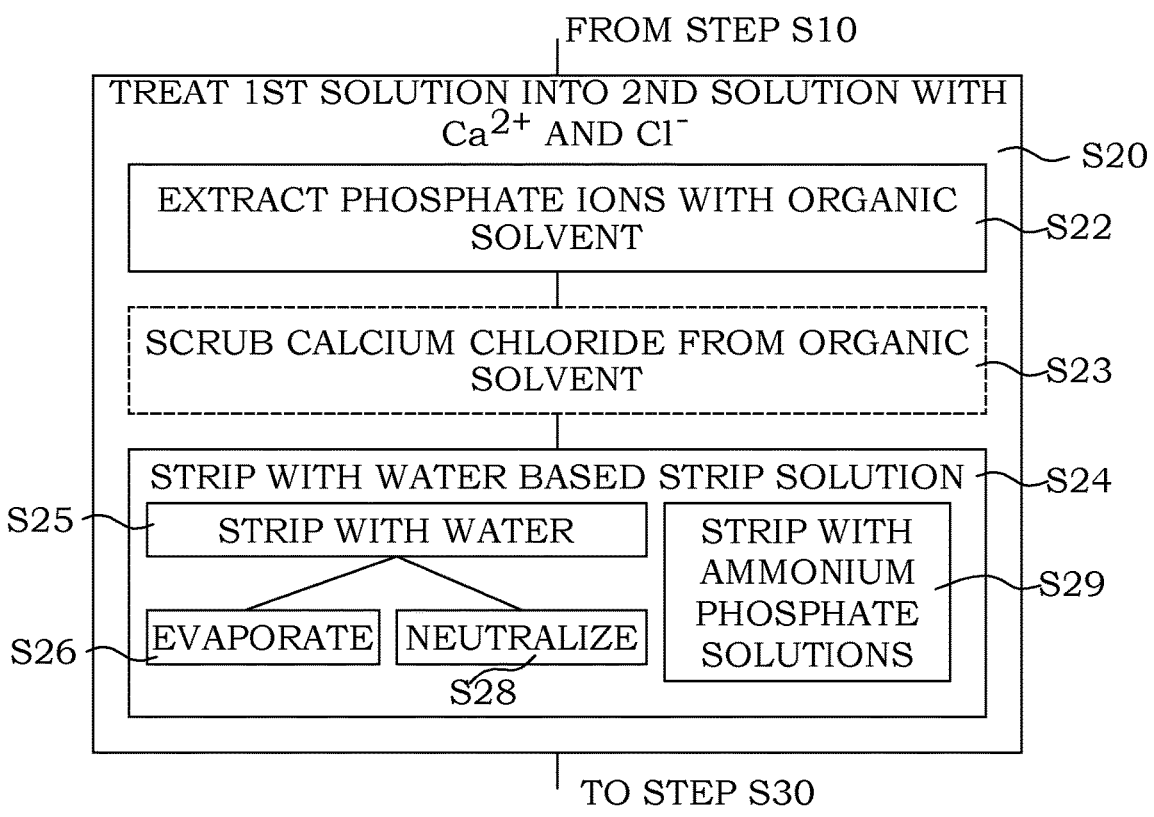
FIG. 7 is a part flow diagram of steps of an embodiment of a method for recovery of commercial substances from apatite associated with extraction of phosphate ions.

The loaded organic solvent has a phosphoric acid concentration of about 1 M and is thereafter preferably scrubbed with water to remove co-extracted calcium chloride, preferably at an organic-to-aqueous ratio of between 5:1 to 20:1, preferably 10:1 in 1-4 contact stages, preferably one contact stage. The scrub solution is preferably recycled back to before extraction since it has a high content of phosphoric acid together with the removed calcium chloride from the solvent. As illustrated in FIG. 7, in a part flow diagram of an embodiment of a method for recovery of commercial substances from apatite mineral, the step S22 is followed by a scrubbing step S23, in which calcium chloride is removed, as described above. Thereafter, in step S24, organic solvent is stripped by a water-based stripping liquid.

In one embodiment, as illustrated by step S25, the phosphate-loaded solvent is stripped with water in a high organic-to-aqueous ratio in order to obtain a high concentration of phosphoric acid in the stripped product. Examples of organic-to-aqueous ratios are above 3:1 in preferably at least 4 contact stages.

The obtained phosphoric acid can in particular embodiments, as illustrated by step S26, be concentrated by evaporation to form a commercial phosphoric acid product. If sulfuric acid for use in the later gypsum precipitation is produced by use of elemental sulfur as a raw material a large amount of heat is generated without emissions of carbon dioxide. This exothermic chemical energy can be used for concentrating the phosphoric acid. Alternatively, or in combination, in one embodiment, the obtained phosphoric acid can, as illustrated in step S28, be neutralized with ammonia to form different ammonium phosphate products such as monoammonium phosphate or diammonium phosphate.

It is also possible to strip the loaded organic solvent with ammonium phosphate solution according to our previous U.S. Pat. No. 9,738,522B2 or to contact the loaded organic solvent directly with ammonia according to our previous patent WO 2010/138045. Thus, in an alternative embodiment, as illustrated by step S29, the phosphate-loaded solvent is stripped with an ammonium-phosphate water solution, thereby producing different ammonium phosphate products such as monoammonium phosphate or diammonium phosphate.

The removing of a bleed solution is a necessity, however unwanted, in order to be able to use the process as a circular process. As was discussed here above, the second solution and thereby also the bleed solution will comprise minor concentrations of phosphate ions. Although these phosphate levels preferably are kept as low as possible, the removal of the bleed solution will result in a loss of valuable phosphate ions at the same time as they may become an obstacle in the future use of the bleed solution. In a preferred embodiment of a method for recovery of commercial substances from apatite mineral, of which a part flow diagram is illustrated in FIG. 8, actions are taken to recover this remaining phosphate ions.

Figure 8:
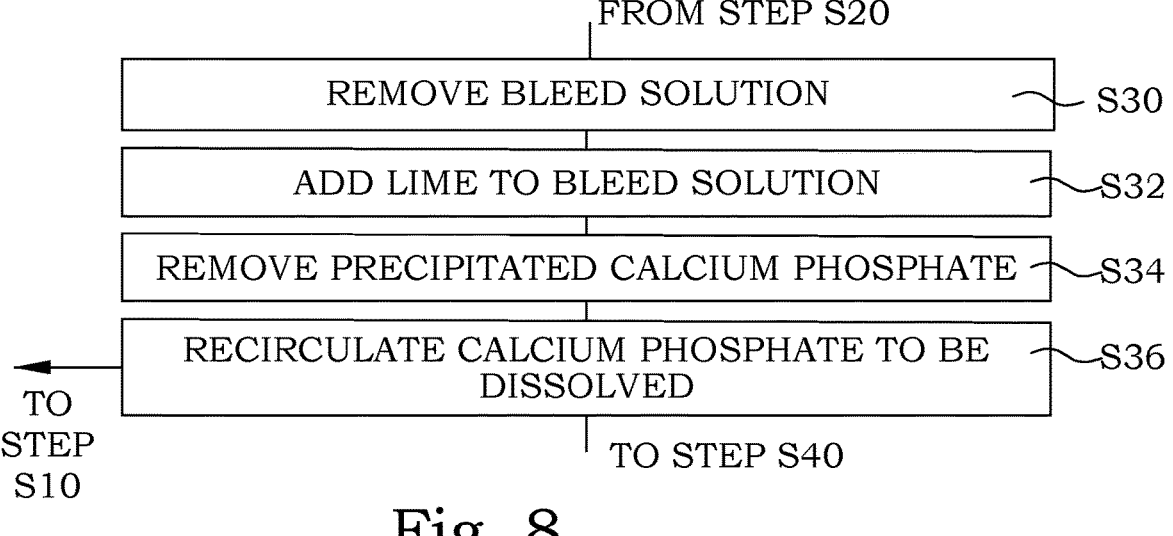
FIG. 8 is a part flow diagram of steps of an embodiment of a method for recovery of commercial substances from apatite associated with treatment of bleed solution.

In FIG. 8, in step S30, a bleed solution is removed from the second solution. This bleed solution comprises minor amounts of phosphate ions. In step S32, limestone is added into the bleed solution, resulting in precipitation of calcium phosphate. At the same time, carbon dioxide will disadvantageously be emitted. In step S34, precipitated calcium phosphate is removed from the bleed solution. In step S36, the removed precipitated calcium phosphate is recirculated to be dissolved together with the apatite mineral in a subsequent step (S10) of dissolving apatite mineral in an acid. This approach saves the phosphate ions, but require additional dissolution acids and gives rise to an unwanted emission of carbon dioxide.

Contaminants, such as iron, cadmium, arsenic and fluorine, may be present in the first solution depending on the composition of the original apatite mineral material. Preferred methods to deal with such contaminants are discussed further below.

Also, rare earth elements may be present in the first solution. However, since rare earth elements are not significantly extracted by e.g. TBP, recovery of rare earth elements may in preferred embodiments be performed from the second solution. This will also be discussed further below.

The raffinate, possibly after precipitation of rare earth elements, is mainly composed of calcium chloride ($CaCl_2$), though a certain amount of residual phosphoric acid is present as well as other chloride salts such as magnesium chloride, sodium chloride, etc. By addition of sulfuric acid, gypsum can be precipitated and at the same time HCl is regenerated. This HCl can be reused and can be recycled to the dissolution reactor.

Gypsum is a major by-product from processing apatite. 5.2 tons of gypsum is produced for each ton of phosphoric acid that is recovered. Therefore, as described before it is advantageous to recover gypsum without any significant co-crystallization of phosphoric acid and fluorosilicates as typically is the case for the state-of-the-art phosphogypsum. Another interesting aspect is to be able to wash out all the hydrochloric acid to obtain a sufficiently low chloride content in the gypsum that will allow for commercial applications.

Gypsum can be obtained generally in three forms: a) anhydrite $CaSO_4$, b) hemihydrate $CaSO_4 \cdot 0.5H_2O$, and c) dihydrate $CaSO_4 \cdot 2H_2O$. The different forms of gypsum can therefore remove different amounts of water from the process solution as crystal water in the gypsum lattice. While anhydrite has no crystal water, the water content in hemihydrate is 6% and that of dihydrate is 21% by weight. According to the present ideas it is desirable to precipitate gypsum in the form of gypsum dihydrate since it can enable the removal of more than one ton water for each ton phosphoric acid that is produced. The significant removal of water with the gypsum dihydrate reduces correspondently the amount of bleed needed.

A major input chemical to the whole process is sulfuric acid. The precipitation of gypsum dihydrate by feeding sulfuric acid into a series of continuous stirred reactors is described in the literature e.g. in Hydrometallurgy 96 (2009) pp. 95-102. The concentration of the sulfuric acid that is used in this reference is at maximum 8M, which corresponds to about 50% by weight, in order to achieve a filterable gypsum. However, using a dilute sulfuric acid of 50% by weight means a significant addition of water to the circulating process solution. The amount of water added with the sulfuric acid in that case amounts to about 3 tons water per ton phosphoric acid. Such large addition of water will require to have a correspondingly large bleed for maintaining the water-balance, which makes the process economically unviable.

According to the present ideas, the aim is to use concentrated sulfuric acid, or at least a high-concentration sulfuric acid, and at the same time to precipitate gypsum in a dihydrate form for improving the whole water-balance in the system. However, when the present inventors tested addition of concentrated sulfuric acid directly to the raffinate, the gypsum formed had a very low dry matter content of below 50% and was difficult to filter and wash. The conclusion was that it is not straight-forward to obtain gypsum of commercial quality by this procedure as described in example 1.

Example 1

$H_2SO_4$ (96%) was added slowly to 200 mL of a $CaCl_2$ (3 M) and $H_3PO_4$ (0.19 M) solution under mechanical stirring at 300 rpm. The temperature increased from 21° C. to 40° C. over the addition period of 4 minutes. After the addition of 19 mL out of the intended 29 mL, the mixture had become so thick that stirring became difficult. The mixture had a performance similar to whipped cream. The mixture was transferred to a Büchner funnel with a spoon and was filtrated through filter cloth at −0.5 bar. 87 mL of a yellow filtrate was obtained. The cake was washed with 300 mL deionized water. The cake thickness was measured in 5 places: (1.12, 1.16, 1.26, 1.10 and 1.11 cm). Dry content was measured by drying a sample of the cake at 50° C. (D/C 48%). Total dry cake weight was 72 g. The dry cake was white with a hint of yellow and had a HCl smell, indicating poor washing.

This example shows that it is not straight-forward to obtain commercial gypsum from apatite by adding concentrated sulfuric acid to the raffinate. The reason is believed to be the high supersaturation caused by the concentrated sulfuric acid as well as the local heat generated during the rapid dilution of concentrated sulfuric acid into the raffinate. Dilution of concentrated sulfuric acid is very exothermic generating a large amount of heat, especially in the initial dilution steps from 98% to 70% by weight.

However, it was surprisingly found by the present inventors that gypsum dihydrate with very high dry matter content of about 70% indeed is possible to obtain by adding the concentrated sulfuric acid and the raffinate simultaneously into a stirred reactor in the presence of gypsum crystals. This is illustrated by example 2.

Example 2a

An overflow reactor with a mechanical stirrer was used. The reactor was filled with 1 liter tap water. Pumping speeds of tube pumps were tested before the experiment and the pump speeds were for $CaCl_2$ at 44.5 rpm equal to 880 mL/h, and for $H_2SO_4$ at 8.0 rpm equal 120 mL/h. The starting temperature was recorded to be 16.6° C. The stirrer was placed in the middle of the water height. The $CaCl_2$ (3 M) and $H_2SO_4$ (97%, 18M) solutions were pumped in simultaneously. After 1 h, the temperature was found to be 36.2° C. and the reactor was slowly heated to 60° C. within about 30 min. After 5 h a 12 min long sample was taken, 210 mL, warm. This sample was filtrated within 1 sec. The cake was left to dry for 2 min. The amount of filtrate was 128 mL and a sample of the filtrate was taken. The cake was washed in the three steps of 50 mL, each time cleaning the Büchner funnel. The amount of filtrate for the washing steps was: 45 mL, 46 mL and 47 mL. A sample was taken after each step. All the sample were analyzed by titration with 0.1 M NaOH the next day, whereby some precipitation was observed. Cake thickness was measured in 2 places 1.250, 1.070. The cake weighed 93.45 g and was 68.86% dry, when dried at 60° C. Drying the dried cake at 200 ° C. gave a D/C of 79.87%. The filtrate was analyzed for $SO_4^{2-}$ (2.08 g/L) and $Ca^{2+}$ (23.0 g/L). Another 12 min sample was collected, 205 mL, warm. The cake was washed with 2×100 mL ethanol. The cake had a dry content of 89.47% (60° C.) and was 80.17% dry upon heating at 200 ° C. (7% hemihydrate).

Example 2B

An overflow reactor with a mechanical stirrer was used. The reactor was filled with 1 liter tap water. Pumping speeds of the tube pumps were tested before the experiment (Pump speeds: $CaCl_2$/$H_3PO_4$ 44.5 rpm=880 mL/h, $H_2SO_4$ 8.0 rpm=120 mL/h). The starting temperature was recorded to be 19.6° C. Stirring was performed at 33.7 Hz and the stirrer was placed above the middle of the water height. The $CaCl_2$ with $H_3PO_4$ (3 M and 0.19 M, respectively) and $H_2SO_4$ (97%, 18M) solutions were pumped in simultaneously. After 5 h, a 12 min long sample was taken, 194 mL. At this point the temperature was 40.8° C. The sample was filtrated for 2 seconds at 0.5 bar and left to dry under vacuum for 2 min (116 mL filtrate). A sample of the filtrate was taken, and the cake was washed with water, 3×50 mL. The cake was dried at 60° C. to evaporate all non-crystal water (67.66% D/C) and then at 200 ° C. to evaporate the crystal water (79.5%

D/C, >90% dihydrate). Another 12 min sample was collected and filtrated. The cake was washed with 2×100 mL ethanol. The cake was dried at 60° C. (75.12% dry). Drying at 200 ° C. afterwards gave a D/C of 80.24% (>90% dihydrate).

These examples show that it is possible to obtain commercial gypsum from apatite by adding concentrated sulfuric acid according to the above ideas with or without phosphoric acid in the background. This is done in a way that the added sulfuric acid is fed into the reactor in a rate being adapted to the calcium content in the raffinate to avoid too large excess of sulfuric acid. Preferably, the sulfuric acid is dosed to keep a slight excess of calcium chloride in the regenerated hydrochloric acid. This decreases the solubility of gypsum by a salting out effect. FIG. 9 illustrates a part flow diagram of a preferred embodiment of a method for recovery of commercial substances from apatite mineral. In step S44, the sulfuric acid is dosed to keep a slight excess of calcium chloride in the regenerated hydrochloric acid.

In other words, in one embodiment, the step of adding the second solution and the sulfuric acid is performed with respective rates giving a stoichiometric excess of calcium to sulfuric acid in the continuously stirred reactor between 0-50% and more preferably 0-20%.

Despite the local heat generated by the concentrated sulfuric acid and the high local concentration it was surprisingly found that it was possible to precipitate the gypsum in a dihydrate form with less than 10% hemi-hydrate as can be seen in example 2 above. In the reported literature, such as according to U.S. Pat. No. 9,783,428, in all the reported cases in which concentrated sulfuric acid was used the gypsum precipitated was in form of alpha-hemihydrate.

The dihydrate formation is believed to have been favoured by the presence of gypsum crystals in the stirred solution. By presenting gypsum crystals in the continuous-stirred reactor already when the second solution and the sulfuric acid first enters, the gypsum crystals may act as nucleation centers, at which further precipitation of dihydrate gypsum can take place. The gypsum crystals can be entered into the continuous-stirred reactor separately, or as a part of the second solution stream and/or the sulfuric acid stream.

Since the above procedure operates for concentrated sulfuric acid, this is of course the preferred concentration, since it minimizes the amount of water added to the system. However, also other high concentration sulfuric acids can be utilized. However, the lower concentration used, the higher will the added amount of water be. This is illustrated by step S45 in FIG. 9, in which concentrated sulfuric acid is used.

In other words, in one embodiment, the sulfuric acid has a concentration of at least 13 M. Preferably, the sulfuric acid has a concentration of at least 15 M. Most preferably, the sulfuric acid has a concentration at least 17.5 M.

It is presently believed that a lower temperature will favour precipitation of gypsum dihydrate. It is therefore preferred to arrange for keeping the temperatures down, at least below 150° C., and more preferably below 60° C., during the precipitating solid gypsum. Step S46 comprises the step of controlling the temperature to be less than 150° C., and more preferably less than 60° C. during the gypsum precipitation.

In the experiment 2 above, the simultaneous adding of the second solution and the sulfuric acid was allowed to form a slurry of the precipitated gypsum and reformed hydrochloric acid. Such a slurry has been proven to be possible to filtrate into a third solution comprising hydrochloric acid and a filter cake. It is preferably to have an as high dry matter content as possible of the filter cake and a dry matter content of above 50% was readily obtained, and a dry matter content of above 70% was indeed also possible to have. Thus, in step S47, a slurry is formed and filtered into a high dry matter content.

In other words, in one embodiment, the step of precipitating solid gypsum comprises the step of forming a slurry of gypsum and hydrochloric acid which upon filtration forms a filter cake with a dry matter content of above 50%, preferably above 70% and the step of filtering the slurry to produce the solid gypsum.

Furthermore, it has been proven by the present inventors that after precipitating gypsum with concentrated sulfuric acid according to the above ideas and washing the gypsum with water, it was possible to obtain <0.01% (<100 ppm) Cl⁻ content in the cake which fulfils the commercial requirements for using the product for application such as gypsum board, cement, filler applications, etc. The presence of residual phosphoric acid, which, as discussed before, was surprisingly not fully extracted by the organic solvent as it was expected based on the existing literature, did not co-crystallize in the gypsum. This enables production of a commercial gypsum product. In step S48, the precipitated gypsum was washed.

By producing gypsum dihydrate with a high dry matter content according to the invention, the wash water required for washing the gypsum can be reduced and thereby reduce correspondently the amount of bleed needed. The required water amount for achieving a reasonably good washing was found to correspond to the amount of cake water of the filtered solid gypsum.

In other words, in one embodiment, the step of precipitating solid gypsum comprises the further step of washing the filtered solid gypsum with a chloride deficient wash solution in which the amount of wash water is at least sufficient to replace the cake water of the filtered solid gypsum.

Therefore, a preferred embodiment of the present technology enables a cost-efficient processing of apatite in the hydrochloric acid route by minimizing the amount of required bleed according to four different mechanisms. The first mechanism comprises the production of gypsum dihydrate. This enables to remove a significant amount of water from the process solution by crystallizing water within the gypsum. The second mechanism relates to the use of concentrated sulfuric acid. The use of concentrated sulfuric acid (>98%) in comparison with a 50% acid enables exclusion of the addition of 3 tons of water per ton phosphoric acid. A third mechanism is constituted by reduced need for wash water for gypsum. By forming gypsum dihydrate with a high dry matter content of at least 70 percent by weight, the amount of wash water for obtaining gypsum of sufficient quality is reduced considerably. The fourth mechanism is connected with a reduced makeup volume of hydrochloric acid. By improving the overall water-balance, the calcium chloride bleed can be minimized. This enables to recirculate more hydrochloric acid within the process. Increased circulation of hydrochloric acid means that the makeup hydrochloric acid to the process can be reduced significantly. Since hydrochloric acid is normally added to the process in form of 36% by weight solution, the reduction in makeup hydrochloric acid further reduce addition of water to the process and further improves the whole water-balance.

Figure 10:
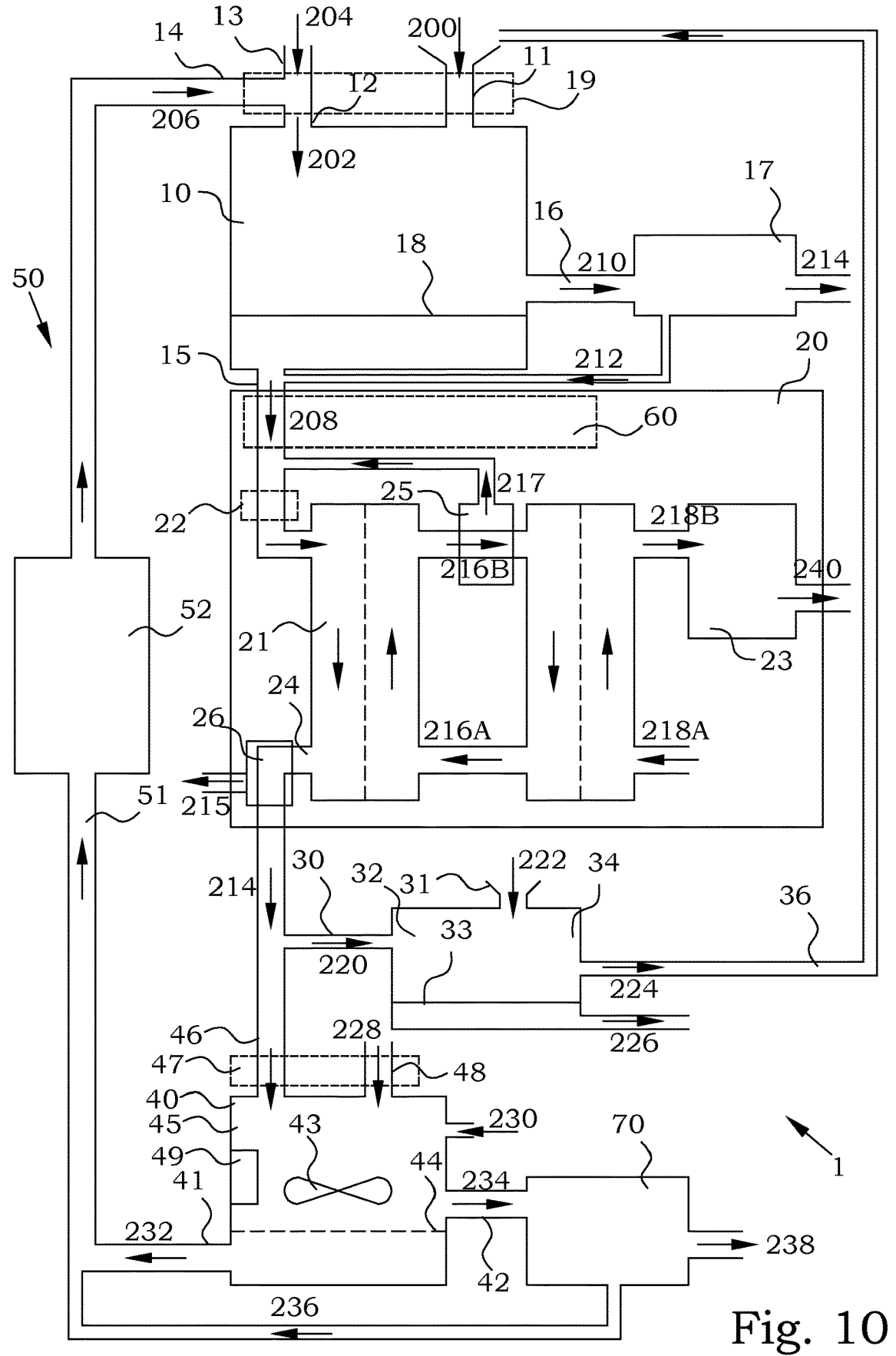
FIG. 10 is schematic illustration of an embodiment of an arrangement for recovery of commercial substances from apatite mineral.

The above description of the present ideas has been concentrated about a method description. In FIG. 10, an embodiment of an arrangement 1 for recovery of commercial substances from apatite mineral is illustrated. A dissolution reactor 10 has an inlet 11 for apatite mineral 200, an inlet 12 for an acid comprising hydrochloride 202, and an outlet 15 for a first liquid solution 208 comprising phosphate ions, calcium ions and chloride ions.

Preferably, the dissolution reactor 10 comprises dissolution control equipment 19 configured for controlling the amount of apatite mineral 200 and the amount of acid comprising hydrochloride 202 to obtain a liquid-to-solid ratio between 1 and 5, preferably between 2.8 and 3.6.

In this particular embodiment, recycling of hydrochloric acid is utilized. To this end a recycling equipment 50 is configured for recycling at least a part of the third liquid solution 232 from a gypsum precipitator 40 as at least a part 206 of the acid 202 comprising hydrochloride into the dissolution reactor 10. In this particular embodiment, this is achieved by a return pipe 51 and a storage tank 52, where the storage tank is connected to an inlet 14 for recycled hydrochloric acid. Makeup volumes of hydrochloric acid 204 is added through an inlet 13 for additional hydrochloric acid.

The dissolution reactor 10 comprises in this embodiment a filter arrangement 18, separating the first liquid 208 from nondissolved residues 210, and an outlet 16 for these non-dissolved residues 210. The nondissolved residues 210 are preferably, provided to a washing equipment 17 in which remaining traces 212 of the first solution is washed away and returned to the main stream of first solution 208. Alternatively, the wash water can be recycled directly back to the dissolution reactor itself. Washed non-dissolves residues 214 are exited from the arrangement, e.g. for deposition.

The first liquid solution 208 is brought to a treatment section 20 configured for treating the first liquid solution into a second liquid solution comprising calcium ions and chloride ions. As will be discussed more in detail below a pre-treatment section 60 can be provided as a part of the treatment section 20 downstream of the dissolution reactor 10. The treatment section 20 further comprises an extraction unit 21, configured for extracting a major part of the phosphate ions using an organic solvent.

In a preferred embodiment, the extraction unit 21 is a liquid-liquid extractor, in which phosphate ions are selectively transferred from the water based first solution to an organic solvent 216A, e.g. having TBP as extractant possibly provided in a diluent.

Preferably, before stripping, the organic solvent is scrubbed with water in a scrubber 25 to remove co-extracted calcium chloride into a scrub solution 217, preferably at an organic-to-aqueous ratio of between 5:1 to 20:1, preferably about 10:1 in 1-4 contact stages, preferably one contact stage. The scrub solution 217 is preferably recycled back to a stage before extraction since it typically has a high content of phosphoric acid together with the removed calcium chloride from the solvent.

The phosphate-ion-enriched organic solvent 216B is then stripped by donating its phosphate ions to a stripping liquid 218A, e.g. water or ammonium phosphate solutions. The phosphate-ion-comprising stripping liquid 218B, e.g. in the form of phosphoric acid or different kinds of phosphate salt solutions or solids are exited from the process. The extraction can be arranged to be performed in several consecutive contact stages. As discussed above, in a preferred embodiment, the extraction unit 21 is a multi-stage extraction unit having at least 4 contact stages, preferably at least 5 contact stages. Furthermore, in a preferred embodiment, the multi-stage extraction unit 21 comprises extraction control equipment 22 configured for controlling an organic-to-aqueous ratio between the organic solvent 216A and the first solution 208 to be between 1:1 and 3:1, preferably between 7:5 and 8:5. Such extraction units 21 are known, as such, in prior art and are not discussed in any further details. The processes in the extraction unit 21 turns the first solution into a raffinate or second solution 214. The extraction unit 21 may also comprises different kinds of post-treatment sections 23, where the phosphate-ion-comprising stripping liquid 218B can be further refined, which will be discussed in more detail further below.

In a preferred embodiment, the extraction unit 21 is configured for providing the second liquid solution 214 with a residual phosphorus content of less than 10 g P per liter.

The arrangement 1 for recovery of commercial substances from apatite mineral further comprises a bleed outlet 30 connected to an outlet 24 for the second solution 214 from the treatment section 20. By this bleed outlet 30, a bleed solution 220 is removed from the second solution 214.

In a preferred embodiment, the arrangements around the bleed outlet 30 further comprises a residual phosphate collection equipment 32 connected to the bleed outlet 30. The residual phosphate collection equipment 32 comprises a bleed solution treatment chamber 34, a precipitation remover 33 and a phosphate recirculation equipment 36. The bleed solution treatment chamber 34 is configured for adding lime 222 into the bleed solution 220 by an inlet 31, resulting in precipitation of calcium phosphate 224. The precipitation remover 36 is configured for removing the precipitated calcium phosphate 224 from the bleed solution 220, leaving a final bleed solution 226. The phosphate recirculation equipment 36 is configured to provide the removed precipitated calcium phosphate 224 to the dissolution reactor 10 to be dissolved together with the apatite mineral 200.

The arrangement 1 for recovery of commercial substances from apatite mineral further comprises a gypsum precipitator 40. The gypsum precipitator comprises a continuous-stirred reactor 45. The continuous-stirred reactor 45 has inlets 46, 48 for simultaneous addition of the second solution 214 from the treatment section 20 and sulfuric acid 228. The addition takes place in the presence of gypsum crystals 230, illustrated by an inlet 48. The gypsum crystals could alternatively or in addition be provided together with one or both of the second solution 214 and the sulfuric acid 228.

Preferably, the inlets 46, 48 for simultaneous addition are configured for addition of sulfuric acid has a concentration of at least 13 M, preferably at least 15 M and most preferably at least 17.5 M.

In a preferred embodiment, the gypsum precipitator 40 further comprises means 47 for controlling the relative amounts of the second solution 214 and the sulfuric acid 228 that is simultaneously added. As mentioned further above, these means 47 for controlling the relative amounts may comprise different kinds of pumping or flow restriction equipment.

Preferably, the continuous-stirred reactor 45 comprises temperature control means 49 for maintaining a process temperature in the continuous-stirred reactor 45 below 150° C. and preferably below 60° C.

The gypsum precipitator further comprises an outlet 41 for a third liquid solution 232 comprising hydrochloride and an outlet 42 for precipitated solid gypsum 234 comprising at least 70% in a di-hydrate crystal form.

Preferably, the gypsum precipitator 40 further comprises a filter 44 for filtering a slurry of gypsum and hydrochloric acid from the continuous-stirred reactor forming a filter cake with a dry matter content of above 50%, preferably above 70%, to produce the solid gypsum.

Preferably, the gypsum precipitator 40 further comprises a washing unit 70 for washing the filtered solid gypsum 234. Thereby, washed gypsum 238 is produced, which is of commercial grades and can be used for e.g. constructional or filling purposes. The wash liquid 236, comprising small amounts of hydrochloric acid, is re-entered into the third solution.

The apatite mineral used for the original dissolution may have slightly differing components depending on its origin. In apatite minerals originating from e.g. beneficiation tailings from iron ore processing, contaminants such as iron, arsenic, silica or rare earth elements may be present. Other sources of apatite minerals may have other types of contaminants as well. Some contaminants are of very low concentrations and may be coextracted e.g. by the nondissolved residues, the phosphorous acid or the gypsum in concentrations that are not problematic in view of the final use of these materials. However, in some cases, different types of coextraction and/or the concentrations of contaminants are such that the quality of the final products may be influenced. In such cases, different kinds of additional treatment may be preferable within the main scope of the present technology. Some examples of relative common contaminants and different solutions to mitigate their effect on the main process are presented here below.

Preferably, after filtration of the nondissolved residue, the leachate, i.e. denoted as the first solution further above, is pretreated in the dissolution reactor 10 or in the pretreatment section 60 before subjected to solvent extraction. The pretreatment may involve settling or polishing filtration to remove particles for protecting the subsequent solvent extraction operation. It was also found by the present inventors that, in order to reduce crud formation during solvent extraction operation, it is preferred to reduce the amount of colloidal silica formed that can cause severe crud problems. Colloidal silica ends up in acidic ore leachates upon the liberation of silicic acid from silicate minerals present in the ore during leaching. The solubility limit for silicic acid in acidic solutions at pH 2 is approximately 150 ppm, and at lower pH this is even less. Above this concentration, silicic acid polymerizes to form colloidal particles, precipitates or a gel. Even low levels of silica, of which as little as 50 ppm is present as colloidal silica, can interfere with solvent extraction and cause phase separation issues and crud, which leads to significant losses of the organic phase and/or makes it impossible to run the process. Due to their very small size, 0.01-0.5 μm, colloidal silica particles are very difficult to remove immediately after leaching using conventional methods, such as sedimentation or filtration, and require therefore preferably dedicated treatment.

Colloidal silica can be removed by adding a coagulant to the leachate or into the dissolution reactor itself. This will bind and grow colloidal silica particles enabling their sedimentation, clarification or filtration or even solvent operation with significantly lower losses of the organic phase. FIG. 11 is a part flow diagram of an embodiment of a method for recovery of commercial substances from apatite mineral. The step S10 of dissolving apatite mineral in hydrochloric acid there comprises the step S15, in which coagulants are added to the leachate or to the dissolution reactor to grow colloidal silica particles. In step S18, the colloidal silica particles are separated together with the nondissolved residues, and in step S19, the nondissolved residue are washed. These process steps may be performed in the dissolution reactor 10 or in a dedicated unit in the pre-treatment section 60 (FIG. 10).

If crud occurs during stripping due to the formation of colloidal silica, e.g. due to accumulation above the stability thresholds or pH changes, a silica coagulant can be added to the strip solution to minimize crud formation and facilitate phase separation. Surprisingly, it was also found that the crud problems can be eliminated by reacting colloidal silica with fluorine compounds such as NaF, $NH_4F$, HF to form dissolved fluorosilicate. Handling of fluorosilicate is discussed further below.

Iron is generally unwanted in phosphorus fertilizers since it can influence the availability of phosphorus to plants even though iron itself is a micro-nutrient. In a typical chloride system, ferric iron forms anionic complexes with chloride ($FeCl_4^-$), which are extracted (together with a proton) by TBP in preference to phosphoric acid. This means that any dissolved ferric iron will be extracted by the organic solvent and will end up in the phosphoric acid or ammonium phosphate products.

The iron in Swedish apatite is mainly in from of magnetite, which has a limited solubility in hydrochloric acid under the specific dissolution conditions. For these reasons it may, depending on the nature of the original apatite mineral, be possible to operate the present system also without any pretreatment for removal of iron.

However, if the dissolved apatite mineral gives dissolved iron in the leachate, iron in the form of ferric iron can preferably be separated by selective extraction with TBP before the main extraction of phosphoric acid, since extraction of anionic complexes of ferric iron with chloride occurs in preference compared to phosphoric acid. For that purpose, it is advantageous to mix the TBP with at least a modifier or a modifier and a diluent to avoid third phase formation during the extraction of ferric iron. Example of a modifier is a long chain alcohol like dodecanol, and example for a diluent is kerosene. In FIG. 12, a part flow diagram of an embodiment of a method for recovery of commercial substances from apatite mineral is illustrated. A step S60 is introduced after the step S10 of dissolving apatite. In step S60, iron is removed from the first solution. Step S60 comprises in turn a part step S62, in which ferric iron is removed by solvent extraction using TBP. The process then continues to step S20. These process steps are typically performed in the pre-treatment section 60 (FIG. 10).

The dissolved iron can be in the form of ferric iron as well as ferrous iron since apatite minerals are in many cases refined from magnetite ores in which the iron is present both in ferric and ferrous forms. It was found by the present inventors that extraction of ferrous iron is not favored by TBP. In order to achieve complete extraction of iron, it is then possible to oxidize any dissolved ferrous iron into ferric iron by an oxidizing agent such as hydrogen peroxide or other equivalents. After extraction by TBP, iron can be recovered in form of ferric chloride by stripping with water or dilute hydrochloric acid solution. This alternative is also indicated in FIG. 12, where in step S61, an oxidizing agent is added to the first solution, oxidizing ferrous iron into ferric iron. This step is then followed by step S62 as described above.

An alternative way to minimize the iron content in the recovered phosphorus product, according to the present ideas, is to chemically reduce the ferric iron to ferrous iron prior to extraction of phosphoric acid. This can be done by addition of a reducing agent such as metallic iron, etc. If metallic iron is used it can result in production of hydrogen gas by the neutralization reaction with the hydrochloric acid in the leachate. It has however, been found by the present inventors, as described in example 3 here below, that the reduction reaction is kinetically faster than the neutralization reaction at ambient temperatures which enable efficient reduction. A short contact time and/or appropriate dosing of metallic iron can assure fast reduction of ferric iron with minimum neutralization and hydrogen generation. Dissolved ferrous chloride can later be recovered from the system in the treatment of the bleed by neutralization with lime to precipitate ferrous hydroxide or phosphate.

Example 3

These experiments show that reduction of ferric iron to ferrous iron using metallic iron, occurs in preference to the reaction of the metallic iron with hydrochloric acid and that reduction of ferric iron is a viable method to minimize the amounts of iron co-extracted together with phosphoric acid in the TBP/hydrochloric acid system.

Addition of metallic iron to an acidic hydrochloric acid leachate containing dissolved ferric iron leads to two main chemical processes: i) reduction of species, e.g. $Fe(III)$ to $Fe(II)$ or $Cu(II)$ to insoluble Cu; and ii) reaction of hydrochloric acid with the metallic iron, with generation of hydrogen (neutralization). The process was studied at ambient temperature (21° C.) and elevated temperatures (60-95° C.) using acidic leachates (pH<0). The stoichiometric amount of metallic iron needed for complete reduction of iron and neutralization of the hydrochloric acid was added to the leachate. In all cases, reduction was significantly faster than neutralization. Reduction occurred in just a few minutes, indicated by a change in color from yellow (characteristic to ferric iron) to pale green-blue (characteristic to ferrous iron). At ambient conditions, gas generation (hydrogen) was not significant despite stirring the metallic iron with the leachate for several hours. Much of the metallic iron added remained undissolved even after 24 h; and only very small gas bubbles were seen slowly forming. The pH remained acidic even after 68 h, at which point much of the metallic iron added was still not dissolved. At elevated temperatures, intense bubbling (hydrogen generation) was evident, indicating that neutralization of the acid was more effective. Nonetheless, at 60° C., neutralization was considerably slower than reduction. The pH of the solution was still <0 and iron powder was still present in solution 1.5 h later. At 95° C., the reaction was significantly faster and most of the iron dissolved in 4 h, when the pH of the solution increased to pH 2.

To test how reduction affected the solvent extraction process with TBP, a hydrochloric acid leachate containing 0.1 M $Fe(III)$, 0.7 M $H_3PO_4$ and 2.7 M $CaCl_2$ was stirred for 10 min at 21° C. with the equivalent of 5.6 g/L metallic iron powder (0.1 mol). The leachate changed color from strong yellow to pale blue-green within minutes, indicating reduction of $Fe(III)$ to $Fe(II)$. Generation of gas (bubbling) was not visible during this time; and the iron powder added did not completely dissolve; over 60% of the iron powder was left undissolved. The solution was filtered. Solvent experiments were performed with the reduced solution and an organic phase consisting of TBP. The organic-to-aqueous ratio was 1:1. In parallel, a non-reduced leachate sample was also subjected to the same solvent extraction experiment. Analysis of the aqueous raffinate for the reduced sample revealed that most of the iron (>92% remained in solution and was not extracted by TBP. In contrast, 85% of the $Fe(III)$ in the non-reduced sample was extracted. Extraction of $H_3PO_4$ was similar for both solutions; about 45% of the acid was extracted by TBP. It is believed that the minor amounts of $Fe(II)$ extracted are due either to the incomplete reduction of $Fe(III)$ or the re-oxidation of $Fe(II)$ back to $Fe(III)$ during the solvent extraction batch tests. To achieve a good mixing of the aqueous and organic phases, the solutions were shaken vigorously for 5 min at ambient conditions. It is believed the presence of oxygen in the air and the vigorous mixing may have caused re-oxidation of $Fe(II)$. In practice, this will not be the case as mixing can be done for significantly less time and the oxygen levels in the atmosphere can be controlled, e.g., perform extraction under a nitrogen blanket.

FIG. 13 illustrates a part flow diagram of an embodiment of a method for recovery of commercial substances from apatite mineral. Following step S10, in the step S63, ferric iron in the first solution is reduced to ferrous iron. This may be performed, as described above, by introduction of metallic iron. After step S30 of removing a bleed solution from the second solution, a step S32 of adding lime is present, in analogy with what was described further above. In the presence of ferrous iron, this will cause a precipitation of iron hydroxide and/or iron phosphate. In a step S35, precipitated iron salts are removed from the bleed solution. These process steps are preferably performed in the residual phosphate collection equipment 32 (FIG. 10).

Like iron, in hydrochloric acid media, cadmium ions form an anionic complex with chloride, which is extracted by TBP. Cadmium can be separated by similar methods as discussed for iron. FIG. 14 illustrates a part flow diagram of an embodiment of a method for recovery of commercial substances from apatite mineral. Following step S10, in the step S64, cadmium is removed by solvent extraction using TBP.

In addition, cadmium can also be precipitated with sulfides before extraction of phosphoric acid. FIG. 15 illustrates a part flow diagram of an embodiment of a method for recovery of commercial substances from apatite mineral. Following step S10, in the step S67, sulfide is added to the first solution, causing precipitation of cadmium sulfide. In step S68, the precipitated cadmium sulfide is removed from the first solution. These process steps are preferably performed in the pre-treatment section 60 (FIG. 10).

Alternatively, cadmium can also be precipitated with sulfides from the phosphoric acid strip solution. The cadmium is then co-extracted with the phosphate ions by the solvent extraction and stripped together with phosphoric acid by the stripping solution. By adding sulfides to the loaded stripping solution, cadmium sulfides can be precipitated and removed.

It may be noted that e.g. Swedish apatite is generally of a magmatic origin, with a low cadmium content, which typically does not require separation.

Uranium is also easily extracted by TBP from hydrochloric acid and will end up in the product phosphoric acid. Extraction of uranium with an organic solvent composed of 5% tributyl phosphate in hexene is known, as such, in prior art. FIG. 16 illustrates a part flow diagram of an embodiment of a method for recovery of commercial substances from apatite mineral. Following step S10, in the step S65, uranium is removed by solvent extraction using TBP. This process step is preferably performed in the pre-treatment section 60 (FIG. 10). The Swedish apatite, however, has generally a low uranium content which does not require separation.

The Swedish apatite contains significant amounts of arsenic which typically requires separation. The arsenate molecule is quite similar to the phosphate molecule and therefore follows phosphate during major parts of the whole process.

However, arsenate can be separated from phosphate by sulfide precipitation. Precipitation of arsenic can be done at different locations in the process. The first possibility is to precipitate arsenic before extraction of phosphate. FIG. 17 illustrates a part flow diagram of an embodiment of a method for recovery of commercial substances from apatite mineral. Following step S10, in the step S67, sulfide is added to the first solution. When arsenic is present in the first solution, the sulfide addition causes a precipitation of arsenic sulfide. In step S69, the precipitated arsenic sulfide. is removed from the first solution. These process steps are preferably performed in the pre-treatment section 60 (FIG. 10).

The second option is to precipitate arsenic from the strip solution after extraction and stripping of phosphate. Precipitation of arsenic from the strip solution is preferable due to a smaller process flow. FIG. 18 illustrates a part flow diagram of an embodiment of a method for recovery of commercial substances from apatite mineral. Step S21 of treating the first solution into the second solution additionally comprises the step S25 of stripping the loaded solvent with water, forming a phosphoric acid solution as a strip solution. If the first solution comprised arsenic, the phosphoric acid solution additionally comprises arsenate ions. In step S71, sulfide is added to the strip solution, resulting in precipitation of arsenic sulfide. In step S72, the precipitated arsenic sulfide is removed from the strip solution.

As an alternative, the phosphate ions can be stripped with an aqueous solution of ammonium phosphate and the arsenic can be removed by precipitation of arsenic sulfide from the resulting aqueous solution of ammonium phosphates.

Sulfide precipitation of arsenic must be carried out at acidic conditions. The solubility of arsenic sulfide is low in acidic solutions in contrast to most other heavy metals, so precipitation of arsenic is highly effective, independent of the low pH. In general, there are two possibilities for performing the sulfide precipitation of arsenic: a) using inorganic sulfides and b) using organic sulfides. Inorganic sulfides are cheaper but result in production of $H_2S$ which must be scrubbed e.g. with NaOH and recycled as a precipitation reagent. Organic sulfide products such as TMT15 or AccoPhos800 are more expensive but do not generate $H_2S$.

Swedish apatite can generally be of both fluorapatite type, and of chlorapatite type. It has surprisingly been found by the present inventors that even Swedish chlorapatite contain significant amounts of fluorine, typically a few percent by weight, which typically require separation. Digestion of apatite with hydrochloric acid at ambient temperature results in most of the fluorine ending up as dissolved fluorosilicic acid in solution. A part of the fluorine volatilizes as HF and $SiF_4$ from the digester. Volatilized fluorine compounds can be recovered by conventional scrubbing with water to form recovered fluorosilicic acid. Since a main part of the fluorine remains in solution it is preferably removed from the process solution. A common process for defluorination in the phosphate industry is precipitation of fluorine in the form of sodium fluorosilicate ($Na_2SiF_6$) as was suggested by Habashi et al. A similar precipitation can also be performed using potassium.

FIG. 19 illustrates a part flow diagram of an embodiment of a method for recovery of commercial substances from apatite mineral. Step S10 of dissolving apatite mineral comprises the part step S16 in which sodium chloride and/or potassium chloride is added to the first solution, thereby causing precipitation of sodium fluorosilicate and/or potassium fluorosilicate, respectively. In step S18, the precipitated sodium fluorosilicate and/or potassium fluorosilicate is removed together with the nondissolved residues and is washed in step S19. These process steps are performed in the dissolution reactor 10 (FIG. 10).

Alternatively, the precipitation S16, S18 and S19, of sodium fluorosilicate and/or potassium fluorosilicate may also be performed separately from the dissolving step S10. In such alternative, the process steps may be performed in a dedicated unit in the pre-treatment section 60 (FIG. 10).

In other words, in one embodiment, the apatite mineral further comprises silica. The step of dissolving apatite mineral further comprises the step of adding sodium chloride and/or potassium chloride to the first liquid, resulting in precipitation of sodium fluorosilicate and/or potassium chloride, respectively. The step of dissolving apatite mineral further comprises the step of removing the precipitated sodium fluorosilicate and/or potassium fluorosilicate from the first liquid.

Sodium fluorosilicate can be used as a raw material for production of fluorine compounds as is done by several companies in Asia. However, in Europe there are no companies using this raw material and the preferred recovered product is fluorosilicic acid which is used as raw material for production of fluorine compounds in Sweden.

According to the present technology, one possible option to recover fluorine is to co-extract fluorosilicic acid together with the phosphoric acid into the organic solvent. FIG. 20 illustrates a part flow diagram of an embodiment of a method for recovery of commercial substances from apatite mineral. In step S25 the organic solvent is stripped with water, giving a solution of mainly phosphoric acid, with minor amounts of fluorosilicic acid if the first solution comprises fluorine and silicon. Thereafter, in step S27 the fluorosilicic acid is gas-stripped as gaseous silicon tetra fluoride from the stripped phosphoric acid product during the step S26 of the evaporation and concentration of the phosphoric acid. The gaseous silicon tetra can thereafter be scrubbed with water to form a recovered fluorosilicic acid. In such a way fluorine can be recovered in form of a valuable product.

As an alternative, the fluorosilicic acid can be stripped with an aqueous solution of ammonium phosphate and the fluorine can be removed by precipitation of sodium fluorosilicate or potassium fluorosilicate from the resulting aqueous solution of ammonium phosphates by addition of sodium or potassium ions.

Other alternatives include gas-stripping of gaseous silicon tetra fluoride from the leachate at elevated temperatures Another possibility is to precipitate fluorosilicates from the bleed with the use of lime. FIG. 21 illustrates a part flow diagram of an embodiment of a method for recovery of commercial substances from apatite mineral. Following step S30 of removing a bleed solution from the second solution, the step S32 of adding lime is present, in analogy with what was described further above. If the second solution and thereby the bleed solution comprises fluorine and silicon, fluorosilicates are precipitated. In step S38, these precipitated fluorosilicates are removed from the bleed solution. These process steps are preferably performed in the residual phosphate collection equipment 32 (FIG. 10).

Rare earth elements are not significantly extracted by TBP from hydrochloric acid medium. This enables the recovery of rare earth elements from the raffinate after extraction of iron and phosphoric acid. FIG. 22 illustrates a part flow diagram of an embodiment of a method for recovery of commercial substances from apatite mineral. In step S20, the first solution is treated into the second solution. In step S22, phosphate ions are extracted by solvent extraction. However, as was concluded further above, the extraction is not total, and small amounts of phosphate ions remains in the raffinate. According to the present technology a preferred way for recovery of rare earth elements is precipitation from the raffinate by partial neutralization of the raffinate to a pH of about 1.5 or higher. Thus, in step S75, the raffinate is partially neutralized to a pH of about 1.5 or higher. This results in precipitation of rare earth elements together with remaining phosphate ion in the form of rare earth element phosphates which can be removed in step S76 by solid-liquid separation, e.g. filtration. The rare earth element phosphates can thereafter be sold or further processed. Precipitation of rare earth elements from the raffinate at lower pH guarantees that these are free from iron, especially if ferric iron is reduced to ferrous iron via the aforementioned reduction process with metallic iron. This is because ferrous phosphate and ferrous hydroxide precipitates at much higher pH than ferric phosphate and ferric hydroxide. The iron which is in ferric form it is extracted efficiently into the organic solvent prior to the precipitation of rare earth elements. This eases the further processing of the rare earth element concentrate and thereby increases its value. Preferably, the precipitation of rare earth element phosphate is performed below a pH of 4 and more preferably below a pH of 2. The preferred chemical for increasing the pH is lime or derivatives thereof; calcium carbonate, calcium oxide or calcium hydroxide, since lime is a low-cost chemical and calcium is already present in the system.

As indicated in FIG. 10, these process steps are preferably performed in a rare earth element removing section 26 of the treatment section 20, giving separated rare earth element phosphates 215.

There is, of course, the possibility to precipitate rare earth element directly from the leachate before the solvent extraction. However, it is cheaper to neutralize the solution, i.e. it causes less chemical consumption, after extraction of most phosphoric acid. It is also beneficial for the solvent extraction process to have high acidity in the feed solution, so neutralization prior to solvent extraction is therefore less attractive. Of course, rare earth element can also be removed by other methods such as using solvent extraction with another solvent such as di-(2-ethylhexyl) phosphoric acid (DEHPA), etc. alternatively using ion exchange or membrane technologies. However, chemical precipitation is considered straight-forward, robust and simple and therefore is the preferred option according to the present invention.

In other words, in one embodiment, the apatite mineral further comprises rare earth elements. The treating of the first liquid solution into the second liquid solution further comprises adding of calcium oxide or any other lime-derivable compound to the second liquid, resulting in precipitation of phosphates of rare earth elements, and removing of the precipitated phosphates of rare earth elements from the second liquid.

One typical embodiment of the process according to the present technology may include the following steps: a) dissolution of apatite concentrate, b) separation of dissolved iron, c) extraction of phosphoric acid, d) separation of arsenic, e) separation and recovery of fluorine, f) separation and recovery of rare earth elements, g) separation and treatment of a bleed, h) addition of sulfuric acid and recovery of gypsum, i) addition of makeup hydrochloric acid.

The present invention has therefore many advantages which can enable cost-efficient processing apatite minerals, in particular Swedish apatite minerals. The process according to the present technology enables to improve the overall cost-effectiveness of the process by minimizing the bleed from the process and by producing a gypsum of commercial quality that need not to be disposed. In addition, the present technology enables to recover the phosphorus as a valuable commercial product such as phosphoric acid or ammonium phosphates. Furthermore, preferred embodiments of the present technology enable the recovery of fluorine and rare earth elements in the form of valuable commercial commodities. Additionally, preferred embodiments of the present technology enable separation of unwanted contaminants such as arsenic and iron in a cost-effective way. The above ideas pave the way for setting up an efficient phosphate industry.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for recovery of commercial gypsum from apatite mineral, comprising the steps of:
    dissolving apatite mineral of magmatic origin in an acid comprising hydrochloride, giving a first liquid solution comprising phosphate ions, calcium ions and chloride ions, said step of dissolving apatite mineral is performed at a liquid-to-solid ratio between 1 and 5;
    treating said first liquid solution, resulting in a second liquid solution comprising calcium ions and chloride ions;
    said step of treating in turn comprising the step of extracting a major part of said phosphate ions with an organic solvent; and
    precipitating solid gypsum comprising at least 70% in a di-hydrate crystal form from said second solution;
    said step of precipitating solid gypsum in turn comprising the step of adding said second solution and sulfuric acid simultaneously into a continuous-stirred reactor in the presence of gypsum crystals, whereby said precipitating of solid gypsum gives a third liquid solution comprising hydrochloride;
    said sulfuric acid has a concentration of at least 13 M.

2. The method according to claim 1, wherein said step of adding said second solution and said sulfuric acid is controlled to be performed with respective rates giving a stoichiometric excess of calcium to sulfuric acid in said continuously stirred reactor between 0-50%.

3. The method according to claim 1, wherein said step of precipitating solid gypsum is controlled to be performed at a temperature below 150° C.

4. The method according to claim 1, wherein said step of precipitating solid gypsum comprises the step of forming a slurry of gypsum and hydrochloric acid which upon filtration forms a filter cake with a dry matter content of above 50%, and of filtering the slurry to produce said solid gypsum.

5. The method according to claim 4, wherein said step of precipitating solid gypsum comprises a further step of washing said filtered solid gypsum with a chloride deficient wash solution in which the amount of wash water is at least sufficient to replace the cake water of said filtered solid gypsum.

6. The method according to claim 1, comprising further steps of:

removing a bleed solution from said second solution; and recycling at least a part of said third liquid solution as at least a part of said acid comprising hydrochloride in a subsequent said step of dissolving apatite mineral.

7. The method according to claim 1, wherein said step of extracting a major part of said phosphate ions is performed until said second liquid solution has a residual phosphorus content of less than 10 g P per liter.

8. The method according to claim 1, wherein said step of extracting a major part of said phosphate ions is performed with an organic solvent at an organic-to-aqueous ratio of between 1:1 and 3:1 in at least 4 contact stages.

9. The method according to claim 1, wherein said step of dissolving apatite mineral is performed at a liquid-to-solid ratio between 2.8 and 3.6.

10. The method according to claim 1, wherein said apatite mineral further comprises silica, and wherein said step of treating said first liquid solution resulting in said second liquid solution further comprises a step of adding sodium chloride to said first liquid, resulting in precipitation of sodium fluorosilicate, and a step of removing said precipitated sodium fluorosilicate from said first liquid.

11. The method according to claim 1, wherein said apatite mineral further comprises rare earth elements, and wherein said step of treating said first liquid solution into said second liquid solution further comprises a step of partially neutralizing a raffinate resulting from said extracting of a major part of said phosphate to a pH>1.5 causing precipitation of phosphates of rare earth elements, and a step of filtering said precipitated phosphates of rare earth elements from said raffinate.

12. The method according to claim 1, wherein said apatite mineral further comprises iron, whereby the said method further comprises removing said iron by at least one of the steps:

extracting iron as ferric iron from said first liquid solution by solvent extraction prior to said step of extracting phosphate ions; and reducing any ferric iron to ferrous iron prior to said step of extracting phosphate ions and removing iron hydroxide or iron phosphate precipitated from said bleed solution.

13. The method according to claim 1, wherein said apatite mineral further comprises arsenic, whereby the said method further comprises removing said arsenic by precipitation with sulfide and by at least one of the steps:

removing arsenic sulfide precipitated from said first liquid solution; and removing arsenic sulfide precipitated from a strip solution comprising extracted phosphate ions.

14. The method according to claim 1, wherein said apatite mineral further comprises fluorine, whereby the said method further comprises removing said fluorine by at least one of the steps:

adding sodium chloride or potassium chloride to said first liquid solution to precipitate fluorosilicates and separating precipitated fluorosilicates with nondissolved residues;

stripping fluorosilicic acid as silicon tetra fluorine from a strip solution comprising extracted phosphate ions during evaporation of water from said strip solution comprising extracted phosphate ions; and adding lime to bleed solution causing precipitation of fluorosilicides and removing of said precipitated fluorosilicides.

15. The method according to claim 6, comprising the further steps of adding lime into said bleed solution, resulting in precipitation of calcium phosphate, removing said precipitated calcium phosphate from said bleed solution, and recirculating said removed precipitated calcium phosphate to be dissolved together with said apatite mineral in a subsequent said step of dissolving apatite mineral in an acid.

16. The method according to claim 3, wherein said step of precipitating solid gypsum is controlled to be performed at a temperature below 60° C.

17. The method according to claim 4, wherein said step of precipitating solid gypsum comprises the step of forming a slurry of gypsum and hydrochloric acid which upon filtration forms a filter cake with a dry matter content of above 70% and of filtering the slurry to produce said solid gypsum.

18. The method according to claim 8, wherein said step of extracting a major part of said phosphate ions is performed with an organic solvent at an organic-to-aqueous ratio of between 7:5 and 8:5.

19. A method for recovery of commercial gypsum from apatite mineral, comprising the steps of:

dissolving apatite mineral of magmatic origin in an acid comprising hydrochloride, giving a first liquid solution comprising phosphate ions, calcium ions and chloride ions;

treating said first liquid solution, resulting in a second liquid solution comprising calcium ions and chloride ions;

said step of treating in turn comprising the step of extracting a major part of said phosphate ions with an organic solvent;

removing a bleed solution from said second solution;

adding lime into said bleed solution, resulting in precipitation of calcium phosphate, removing said precipitated calcium phosphate from said bleed solution, and recirculating said removed precipitated calcium phosphate to be dissolved together with said apatite mineral in a subsequent said step of dissolving apatite mineral in an acid; and precipitating solid gypsum comprising at least 70% in a di-hydrate crystal form from said second solution;

said step of precipitating solid gypsum in turn comprising the step of adding said second solution and sulfuric acid simultaneously into a continuous-stirred reactor in the presence of gypsum crystals, whereby said precipitating of solid gypsum gives a third liquid solution comprising hydrochloride;

said sulfuric acid has a concentration of at least 13 M.

20. A method for recovery of commercial gypsum from apatite mineral, comprising the steps of:

dissolving apatite mineral of magmatic origin in an acid comprising hydrochloride, giving a first liquid solution comprising phosphate ions, calcium ions and chloride ions;

treating said first liquid solution, resulting in a second liquid solution comprising calcium ions and chloride ions;

said step of treating in turn comprising the step of extracting a major part of said phosphate ions with an organic solvent at an organic-to-aqueous ratio of between 1:1 and 3:1, in at least 4 contact stages;

removing a bleed solution from said second solution; and precipitating solid gypsum comprising at least 70% in a di-hydrate crystal form from said second solution;

said step of precipitating solid gypsum in turn comprising the step of adding said second solution and sulfuric acid simultaneously into a continuous-stirred reactor in the presence of gypsum crystals, whereby said precipitating of solid gypsum gives a third liquid solution comprising hydrochloride;

said sulfuric acid has a concentration of at least 13 M.

* * * * *